United States Patent
Sun et al.

(10) Patent No.: US 10,117,120 B2
(45) Date of Patent: Oct. 30, 2018

(54) CHANNEL FEEDBACK FOR NON-ORTHOGONAL MULTIPLE ACCESS SYSTEMS

(71) Applicant: QUALCOMM Incorporated, San Diego, CA (US)

(72) Inventors: Jing Sun, San Diego, CA (US); Tao Luo, San Diego, CA (US); Hao Xu, San Diego, CA (US); Yongbin Wei, La Jolla, CA (US); Durga Prasad Malladi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/871,550

(22) Filed: Sep. 30, 2015

(65) Prior Publication Data

US 2016/0119807 A1 Apr. 28, 2016

Related U.S. Application Data

(60) Provisional application No. 62/069,515, filed on Oct. 28, 2014.

(51) Int. Cl.
*H04W 24/10* (2009.01)
*H04W 72/08* (2009.01)
(Continued)

(52) U.S. Cl.
CPC .......... *H04W 24/10* (2013.01); *H04B 7/0417* (2013.01); *H04B 7/0426* (2013.01);
(Continued)

(58) Field of Classification Search
CPC .. H04B 7/0417; H04B 7/0452; H04B 7/0456; H04B 7/0626; H04B 7/0619;
(Continued)

(56) References Cited

U.S. PATENT DOCUMENTS 8,867,494 B2   10/2014 Blanz et al.
2007/0191066 A1   8/2007 Khojastepour et al.
(Continued)

FOREIGN PATENT DOCUMENTS

KR   20110107723 A   10/2011
WO   WO-2013116987 A1   8/2013

OTHER PUBLICATIONS

IPEA/EP, Second Written Opinion of the International Preliminary Examining Authority, Int'l Application No. PCT/US2015/053575, dated Sep. 29, 2016, European Patent Office, Munich, DE, 6 pgs.
(Continued)

*Primary Examiner* — Marsha D Banks Harold
*Assistant Examiner* — Elton Williams
(74) *Attorney, Agent, or Firm* — Holland & Hart LLP

(57) ABSTRACT

Channel feedback for non-orthogonal multiple access (NOMA) multiple-input multiple-output (MIMO) communication systems may be reported by determining a measurement set of transmission strategies for channel feedback for a non-orthogonal channel. Estimates of channel quality for downlink transmissions to the UE corresponding to respective transmission strategies of the measurement set may then be determined. A channel feedback report may then be sent. The channel feedback report may include indicators of channel quality for a subset of the measurement set of transmission strategies.

27 Claims, 16 Drawing Sheets

(51) Int. Cl.
    *H04L 5/00*           (2006.01)
    *H04B 7/0452*       (2017.01)
    *H04B 7/0417*       (2017.01)
    *H04B 7/0426*       (2017.01)
    *H04B 7/06*           (2006.01)
    *H04L 1/00*           (2006.01)
    *H04W 88/02*        (2009.01)
    *H04W 88/08*        (2009.01)
    *H04B 7/0456*       (2017.01)
    *H04J 11/00*         (2006.01)
    *H04L 25/03*         (2006.01)
    *H04L 27/34*         (2006.01)

(52) U.S. Cl.
CPC ......... *H04B 7/0452* (2013.01); *H04B 7/0619* (2013.01); *H04L 1/0029* (2013.01); *H04L 5/0001* (2013.01); *H04L 5/006* (2013.01); *H04L 5/0091* (2013.01); *H04W 72/085* (2013.01); *H04B 7/0456* (2013.01); *H04J 11/003* (2013.01); *H04J 11/0036* (2013.01); *H04L 25/03891* (2013.01); *H04L 27/3488* (2013.01); *H04L 2025/03426* (2013.01); *H04W 88/02* (2013.01); *H04W 88/08* (2013.01)

(58) Field of Classification Search
CPC .... H04B 7/024; H04B 7/0413; H04B 7/0426; H04B 7/0478; H04B 7/063; H04B 7/0632; H04B 7/0636; H04B 7/0639; H04B 17/318; H04L 1/0026; H04L 1/0029; H04W 72/1226
USPC ......................................................... 370/252
See application file for complete search history.

(56) References Cited

U.S. PATENT DOCUMENTS

| | | | |
|---|---|---|---|
| 2008/0025336 A1* | 1/2008 | Cho ..................... | H04B 7/0632 370/432 |
| 2008/0095223 A1 | 4/2008 | Tong et al. | |
| 2008/0188190 A1 | 8/2008 | Prasad et al. | |
| 2008/0188259 A1* | 8/2008 | Blanz ..................... | H04B 7/04 455/522 |
| 2008/0219145 A1 | 9/2008 | Sundaresan et al. | |
| 2009/0080560 A1 | 3/2009 | Na et al. | |
| 2009/0291699 A1 | 11/2009 | Heath et al. | |
| 2010/0322176 A1 | 12/2010 | Chen et al. | |
| 2010/0323684 A1 | 12/2010 | Cai et al. | |
| 2011/0032839 A1* | 2/2011 | Chen ..................... | H04B 7/024 370/252 |
| 2011/0135033 A1 | 6/2011 | Ko et al. | |
| 2011/0142147 A1* | 6/2011 | Chen ................. | H04L 25/03343 375/260 |
| 2011/0188393 A1 | 8/2011 | Mallik et al. | |
| 2011/0310870 A1 | 12/2011 | Van et al. | |
| 2012/0270535 A1* | 10/2012 | Chen ..................... | H04W 24/10 455/422.1 |
| 2012/0320848 A1 | 12/2012 | Chen et al. | |
| 2013/0010744 A1 | 1/2013 | Kang et al. | |
| 2013/0114455 A1 | 5/2013 | Yoo et al. | |
| 2013/0225220 A1 | 8/2013 | Dotzler et al. | |
| 2013/0315337 A1 | 11/2013 | Dai et al. | |
| 2014/0003395 A1 | 1/2014 | Hsu et al. | |
| 2015/0078472 A1 | 3/2015 | Vook et al. | |
| 2015/0349866 A1* | 12/2015 | Benjebbour ............. | H04L 5/00 370/329 |
| 2016/0087694 A1* | 3/2016 | Vilaipornsawai ...... | H04B 7/024 370/329 |
| 2016/0088646 A1 | 3/2016 | Sun et al. | |
| 2016/0119807 A1 | 4/2016 | Sun et al. | |
| 2016/0285525 A1 | 9/2016 | Budianu et al. | |
| 2016/0294454 A1 | 10/2016 | Onggosanusi et al. | |
| 2016/0353457 A1* | 12/2016 | Park ...................... | H04B 7/024 |
| 2017/0142733 A1 | 5/2017 | Wang et al. | |
| 2017/0265145 A1 | 9/2017 | Benjebbour et al. | |

OTHER PUBLICATIONS

Benjebbour et al., "Concept and Practical Considerations of Non-orthogonal Multiple Access (NOMA) for Future Radio Access," 2013 International Symposium on Intelligent Signal Processing and Communications Systems (ISPACS), Naha, Nov. 12-15, 2013, pp. 770-774, XP_32541968A, Institute of Electrical and Electronics Engineers.

ISA/EPO, International Search Report and Written Opinion of the International Searching Authority, Int'l Appl. No. PCT/US2015/053575, dated Dec. 16, 2015, European Patent Office, Rijswijk, NL, 18 pgs.

ITRI, "Discussion on MU-CSI," 3GPP TSG-RAN WG1 Meeting #73, R1-132252, Fukuoka, Japana, May 20-24, 2013, 4 pgs., XP050698024, 3rd Generation Partnership Project.

Motorola, "CQI Enhancements for Release-10," 3GPP TSG RAN1 Meeting #62bis, R1-105616, Xian, China, Oct. 11-15, 2010, 6 pgs., XP050450694, 3rd Generation Partnership Project.

Roessler et al., "LTE-Advanced (3GPP Re. 11) Technology Introduction: White Paper," Jul. 2013, 39 pgs., XP_55166782A, 1MA232_1E, Rohde & Schwarz.

Zakhour et al., "A Two-Stage Approach to Feedback Design in Multi-User MIMO Channels with Limited Channel State Information," The 18th Annual IEEE International Symposium on Personal, Indoor and Mobile Radio Communications (PIMRC '07), Athens, Sep. 3-7, 2007, 5 pgs., ISBN 978-1-4244-1144-3, Institute of Electrical and Electronics Engineers.

ZTE, "CSI Feedback Modes for CoMP," 3GPP TSG RAN WG1 Meeting #69, R1-122135, Prague, Czech Republic, May 21-25, 2012, 5 pgs., 3rd Generation Partnership Project.

ZTE, "Discussion on CSI Feedback for CoMP Based on Carrier Aggregation Feedback Structure," 3GPP TSG RAN WG1 Meeting #67, R1-113763, San Francisco, USA, Nov. 14-18, 2011, 3 pgs., 3rd Generation Partnership Project.

IPEA/EP, Second Written Opinion of the International Preliminary Examining Authority, Int'l Application No. PCT/US2015/049567, dated Sep. 6, 2016, European Patent Office, Munich, DE, 9 pgs.

* cited by examiner

CHANNEL FEEDBACK FOR NON-ORTHOGONAL MULTIPLE ACCESS SYSTEMS

CROSS REFERENCES

The present Application for patent claims priority to U.S. Provisional Patent Application No. 62/069,515 by Sun et al., entitled "Channel Feedback for Non-Orthogonal Multiple Access Systems," filed Oct. 28, 2014, assigned to the assignee hereof, and expressly incorporated by reference herein.

BACKGROUND

Field of the Disclosure

The present disclosure, for example, relates to wireless communication systems, and more particularly to reporting channel feedback for non-orthogonal channels.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Communications systems may take advantage of multiple antenna techniques for increased reliability or capacity. Multiple antenna techniques include transmit diversity and multiple-input multiple-output (MIMO) techniques. MIMO systems that employ T transmit antennas and R receive antennas may realize a capacity increase of min $\{T, R\}$ over single antenna techniques. Another approach includes the transmission of non-orthogonal downlink signals to increase the capacity of a wireless communication system. However, in a multiple access system, the possible variations in techniques including single-user MIMO (SU-MIMO), multiple-user MIMO (MU-MIMO), and/or non-orthogonal multiple access (NOMA) results in challenges in reporting channel conditions over the space of possible combinations of transmissions to multiple UEs.

SUMMARY

The described features generally relate to one or more improved systems, methods, and/or apparatuses for reporting channel feedback for non-orthogonal channels. The channel feedback may be reported by determining a measurement set of transmission strategies (TSs) for channel feedback for a non-orthogonal channel. Estimates of channel quality for downlink transmissions to the UE corresponding to respective TSs of the measurement set may then be determined. A channel feedback report may then be sent. The channel feedback report may include indicators of channel quality for a subset of the measurement set of TSs. The channel feedback report may also indicate, explicitly or implicitly, the TSs corresponding to each indicator of channel quality.

In a first set of illustrative examples, a method for wireless communication at a UE is described. In one example, the method may include determining a measurement set of TSs for channel feedback for a non-orthogonal channel; estimating channel quality for downlink transmissions to the UE corresponding to respective TSs of the measurement set; and sending a channel feedback report comprising indicators of channel quality for a subset of the measurement set of TSs.

In some examples, the method may include determining a minimum data rate threshold based on a proportion of a highest single user data rate for the downlink transmissions; and determining the subset of the measurement set based at least in part on the minimum data rate threshold. In some examples, the method may include determining the subset of the measurement set corresponding to a predetermined number M of the TSs of the measurement set and reporting selection criteria. In some examples, the method may include identifying the reporting selection criteria based at least in part on a filtered signal-to-noise ratio (SNR) of the non-orthogonal channel or a selection mode received from a base station. In some examples, the reporting selection criteria may include one of a random selection criteria or a sequential selection criteria. In some examples, the random selection criteria may include a minimum data rate threshold and a maximum data rate threshold.

In some examples, the method may include determining a highest single user data rate for the downlink transmissions; setting the maximum data rate threshold to the highest single user data rate; and setting the minimum data rate threshold to a proportion of the highest single user data rate. In some examples the channel feedback report may include the indicators of the channel quality for respective TSs of a TS space in a predefined order. In some examples, the method may include communicating, with a base station, the predefined order of the TS space prior to sending the channel feedback report. In some examples, the channel feedback report may include indicators of respective TSs associated with each of the indicators of channel quality for the subset of the measurement set. In some examples, the indicators of the respective TSs may include bits of a bitmap corresponding to a TS space or indexes to the TS space. In some examples, the method may include communicating, with a base station, the TS space prior to sending the channel feedback report. In some examples, determining the measurement set may include applying a set of TS selection criteria to an available TS space.

In some examples, the set of TS selection criteria may include any of power split selection criteria, spatial layer selection criteria for data streams transmitted to the UE, spatial layer selection criteria for data streams transmitted to at least one other UE, or combinations thereof. In some examples, each of the TSs may include any of a precoding matrix, a first set of spatial layers for data streams to the UE, a second set of spatial layers for data streams to at least one other UE, whether interference cancellation is applied to achieve a respective channel quality, a power split, or combinations thereof.

In a second set of illustrative examples, an apparatus for wireless communication by a UE is described. In one example, the apparatus may include means for determining a measurement set of TSs for channel feedback for a non-orthogonal channel; means for estimating channel quality for downlink transmissions to the UE over the non-orthogonal channel corresponding to respective TSs of the measurement set; and means for sending a channel feedback report comprising indicators of the channel quality for a subset of the measurement set of TSs. In some examples, the apparatus may further include means for implementing one or more aspects of the method for wireless communication described above with respect to the first set of illustrative examples.

In a third set of illustrative examples, an apparatus for wireless communication by a UE is described. In one example, the apparatus may include a processor, memory in electronic communication with the processor, and instructions stored in the memory. The instructions may be executable by the processor to determine a measurement set of TSs for channel feedback for a non-orthogonal channel; estimate channel quality for downlink transmissions to the UE over the non-orthogonal channel corresponding to respective TSs of the measurement set; and send a channel feedback report comprising indicators of the channel quality for a subset of the measurement set of TSs. In some examples of the apparatus, the instructions may also be executable by the processor to implement one or more aspects of the method for wireless communication described above with respect to the first set of illustrative examples.

In a fourth set of illustrative examples, a non-transitory computer-readable medium storing computer-executable code for wireless communication by a UE is described. In one example, the code may include instructions executable by a processor for determining a measurement set of TSs for channel feedback for a non-orthogonal channel; estimating channel quality for downlink transmissions to the UE over the non-orthogonal channel corresponding to respective TSs of the measurement set; and sending a channel feedback report comprising indicators of the channel quality for a subset of the measurement set of TSs. In some examples of the non-transitory computer-readable medium, the instructions may also be executable by the processor for implementing one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
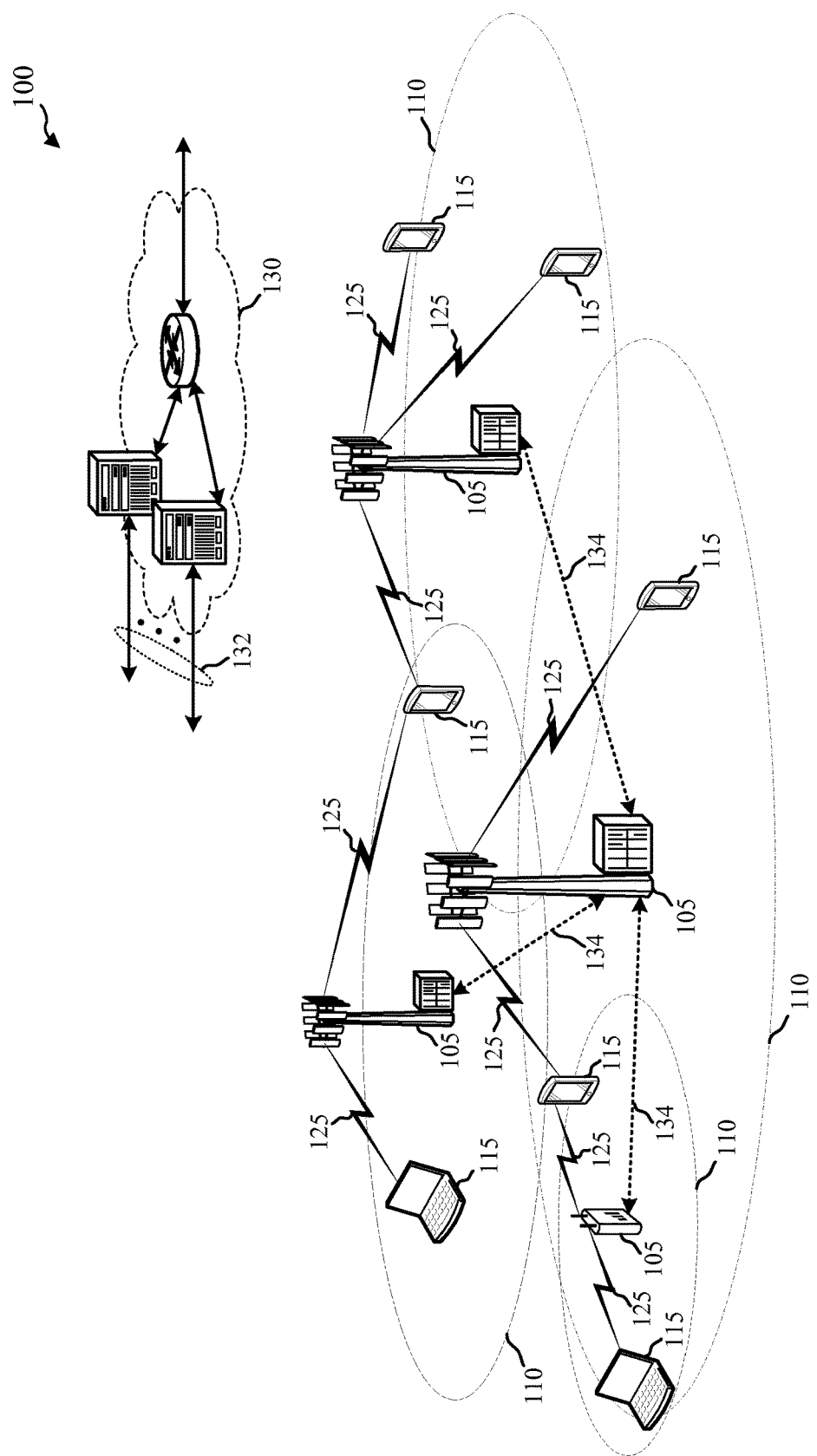
FIG. 1A illustrates an example of a wireless communications system in accordance with various aspects of the disclosure.

Techniques generally relating to channel feedback for enhanced scheduling of transmissions over non-orthogonal channels are described. Base stations and/or UEs may include multiple antennas for employing antenna diversity schemes to improve communication quality and reliability. Additionally or alternatively, base stations and/or UEs may employ multiple-input, multiple-output (MIMO) techniques that may take advantage of multi-path environments to transmit multiple spatial layers carrying the same or different coded data. MIMO techniques include single-user MIMO (SU-MIMO) techniques in which the same or different data streams are communicated on multiple layers between a base station 105 and a single UE and multiple-user MIMO (MU-MIMO) in which multiple streams may be transmitted to or received from spatially-distinguishable users. MU-MIMO may also be called spatial division multiple access (SDMA). In addition, MU-MIMO spatial layers may be aligned (e.g., use the same resource blocks) or un-aligned.

For DL-MIMO transmissions, the mode used for one or more transmissions by the base station may be defined by a transmission strategy (TS). TSs may include a variety of techniques for allocation of resources to UEs. For example, transmissions to different UEs may be differentiated by frequency (e.g., FDMA), spatial layer (e.g., SDMA), or non-orthogonal multiple access (NOMA) techniques. Each TS may be associated with one or more data streams to one or more UEs using various transmission parameters including transmission power, transmission power split between layers, precoding used for spatial layers, time resources, frequency resources, and the like.

NOMA techniques include concurrent, non-orthogonal, data streams provided to the same or different UEs, where each modulation layer may be used to transmit content that may be selected based on particular deployments and/or channel conditions. In some examples, signals for NOMA transmissions may be modulated using hierarchical and/or superposition modulation, in which a first data stream may be modulated for transmission on a base layer of a signal and a second data stream may be modulated for transmission on an enhancement layer of the signal. For example, a base station may transmit a signal having an enhancement layer superpositioned on a base layer to one or more UEs. Additionally or alternatively, the modulation of the first data stream onto the base layer and the second data stream onto the enhancement layer may be hierarchical, in which a symbol constellation of the transmitted signal includes sub-constellations associated with the base layer and enhancement layer. In some examples, a UE may transmit multiple hierarchical and/or superposition modulation layers to a base station in a similar manner.

Hierarchical and/or superposition modulation may be understood as a split of transmission power between the base layer and enhancement layer. For a UE to which the base layer is directed, the enhancement layer may be seen as interference. However, the signal-to-noise ratio (SNR) of the base layer may be at a level that allows successful demodulation and decoding of a first data stream from the base layer even in the presence of interference from the enhancement layer. A UE to which the enhancement layer is directed may demodulate and/or decode symbols and/or data received on the base layer, and then perform interference cancellation to cancel the signal of the base layer. The UE may then demodulate and decode a second data stream from the remaining signal after interference cancellation. When multiple layers in NOMA downlink transmissions share some or all of the same resources (e.g., have partially or fully overlapping resource blocks), a UE may perform an interference cancellation operation on one or more of the layers of the NOMA downlink transmissions, to identify and decode data streams on other layers that are intended for the UE.

Additionally or alternatively, interference cancellation may be used for TSs employing SDMA. For example, a base station may transmit an MU-MIMO transmission including a first data stream for a first UE on a first spatial layer and a second data stream for a second UE on a second spatial layer. The first UE may receive the transmitted signal and demodulate or decode a signal associated with the second spatial layer to perform interference cancellation of the second spatial layer. The first UE may then demodulate and decode the first data stream from the remaining signal after interference cancellation. The second UE may receive the transmitted signal and decode the second data stream (with or without using interference cancellation). In this instance, the portion of the transmission to the first UE is also considered an enhancement layer transmission, as the transmission parameters (e.g., modulation and coding scheme (MCS), etc.) may assume that interference cancellation is being carried out at the first UE to cancel the portion of the transmission to the second UE. As used herein, the term "enhancement layer" refers to a portion of a transmission that is transmitted assuming that the receiver will perform interference cancellation for one or more base layers of the transmission (e.g., to the same or a different receiver) to achieve a desired or intended error rate. The term "base layer" refers to a transmission or portion of a transmission that is transmitted assuming no interference cancellation of other layers at the receiver.

Where a base station serves multiple UEs having different channel conditions which may support orthogonal or non-orthogonal transmission techniques, the possible ways that UEs can share time, frequency, and/or spatial layer resources using various TSs becomes large. The described techniques for providing feedback in a multiple-user environment enhance the possibility of finding optimized TSs for transmissions over non-orthogonal channels. As used herein, "non-orthogonal channels" includes channels of a carrier between a multiple-antenna transmitter and a multiple-antenna receiver for possible transmission layers including both orthogonal and non-orthogonal layers. For example, non-orthogonal channels for a carrier may include channels for transmission techniques such as SU-MIMO, MU-MIMO, and/or NOMA techniques.

Channel feedback from a UE may be reported by determining a measurement set of TSs for a non-orthogonal channel. Estimates of channel quality for downlink transmissions to the UE corresponding to respective TSs of the measurement set may then be determined. A channel feedback report may then be sent. The channel feedback report may include indicators of channel quality for a subset of the measurement set of TSs. The channel feedback report may also indicate, explicitly or implicitly, the TSs corresponding to each indicator of channel quality. The techniques may be applied to provide feedback for enhanced scheduling of transmissions to multiple users over the non-orthogonal channels.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1A illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. The communication links 125 may transmit bidirectional communications using FDD (e.g., using paired spectrum resources) or TDD operation (e.g., using unpaired spectrum resources). Each communication link 125 may include one or more carriers, where each carrier may span a different frequency range and define a channel structure for modulation of information conveyed on the UL, DL, or both UL and DL over the frequency range. For example, each carrier may include one or more formatting channels, one or more control channels, one or more indicator channels, one or more data channels, and the like. Each carrier may have a designated channel number (e.g., E-UTRA Absolute Radio Frequency Channel Number (EARFCN), etc.) based on a relationship between the channel number and the carrier frequency within an operating band.

LTE/LTE-A utilizes multi-carrier modulation (MCM) techniques including orthogonal frequency division multiple-access (OFDMA) on the downlink and single-carrier frequency division multiple-access (SC-FDMA) on the uplink. Each MCM carrier is a waveform signal made up of multiple sub-carriers (e.g., orthogonal sub-carriers, etc.), which are also commonly referred to as tones, bins, or the like. Each sub-carrier may be modulated with information (e.g., reference signals, control information, overhead information, user data, etc.). The spacing between adjacent sub-carriers may be fixed, and the total number of sub-carriers (K) may be dependent on the carrier bandwidth. For example, K may be equal to 72, 180, 300, 600, 900, or 1200 with a sub-carrier spacing of 15 kilohertz (KHz) for a corresponding carrier bandwidth (with guardband) of 1.4, 3, 5, 10, 15, or 20 megahertz (MHz), respectively. The carrier bandwidth may also be partitioned into sub-bands. For example, a sub-band may cover 1.08 MHz, and a carrier may have 1, 2, 4, 8 or 16 sub-bands.

Wireless communications system 100 may support operation on multiple cells or carriers, a feature which may be referred to as carrier aggregation (CA) or multi-carrier operation. The term 'component carrier' (CC) may refer to each of the multiple carriers utilized by a UE in CA operation, and may be distinct from other portions (e.g., other carriers, etc.) of system bandwidth. In CA operation, a UE 115 may be configured to utilize multiple downlink and/or uplink CCs concurrently to provide greater operational bandwidth and, e.g., higher data rates. CCs used in CA operation may be any suitable bandwidth (e.g., 1.4, 3, 5, 10, 15, or 20 megahertz (MHz), etc.), and each individual CC may provide the same capabilities as, for instance, a single carrier based on Release 8 or Release 9 of the LTE standard. Thus, individual CCs may be backwards compatible with legacy UEs 115 (e.g., UEs 115 implementing LTE Release 8 or Release 9); while also being utilized by other UEs 115 (e.g., UEs 115 implementing LTE versions after Release 8/9) configured for CA or in single carrier mode. Alternatively, a CC may be configured to be used in combination with other CCs and may not carry some channels used to support single carrier mode (e.g., format or control channels, etc.). CA may be used with both FDD and TDD component carriers.

In LTE/LTE-A, a channel quality indicator (CQI) may be sent from a UE 115 to a base station 105 to allow the base station 105 to optimize downlink transmission based on the characteristics of the channel. CQI may be defined as an index to a data rate (e.g., coding rate, etc.) and modulation order (e.g., QPSK, 16QAM, 64QAM, etc.), which may also be called a modulation and coding scheme (MCS). The CQI or MCS may translate to a maximum transport block size that can be received by the UE 115 at a certain block error rate (BLER). The UE 115 may determine a CQI by performing measurements on reference signals (e.g., cell-specific reference signals (CRS), CSI reference signals (CSI-RS), UE-specific reference signals (UE-RS), etc.). For non-orthogonal channels, there may be a mismatch between the channel/interference assumed for the CQI report and the actual channel/interference when data is being served to multiple UEs 115 in an MIMO or NOMA format.

When computing the CQI, a UE 115 may assume it is the only UE being served by the base station 105 in a resource block (RB) with a rank 1 transmission. The CQI computation may therefore not account for the transmit power split between two UEs 115 when the UEs 115 are served in a MIMO or NOMA format. In such a format, the signal to each UE 115 may be interference to the other UE 115.

For this reason, the deployed capacity of a system may not match the theoretical capacity. The CQI reported to a base station 105 may not fully reflect the channel, and the base station 105 may apply a large outer-loop backoff to compensate for the rate prediction error. The backoff may cause the MCS to be too conservative due to the width of the CQI error distribution.

In a system employing MU-MIMO and NOMA techniques, the CQI prediction error may be reduced by correctly accounting for the various channel and interference scenarios. For example, the CQI may account for the transmission layers assigned to a particular UE as well as the transmission layers assigned to other UEs. However, there may be a large number of such combinations.

In order for a base station 105 to group two UEs and serve them with one particular TS (e.g., a base layer UE and an enhancement layer UE), the base station 105 may require a base layer CQI under the particular TS from the base layer UE and an enhancement layer CQI under the particular TS from the enhancement layer UE, as well as a base layer CQI from the enhancement layer UE, in some cases. In some examples, the base station 105 may group two UEs for an MU-MIMO transmission. For this example, the base station 105 may require base layer CQIs for the particular TS (e.g., for complementary spatial layers, etc.) from both UEs. To allow the base station 105 to determine optimal groupings, each UE may be required to report base layer CQIs and enhancement layer CQIs for every TS. This may result in tens of CQI reports for grouping two UEs, and hundreds of CQI reports for grouping four UEs. The number of CQI reports may be even larger for frequency selective channels where sub-band reporting is used.

The base layer CQI may be dependent on the selected TS. For example, the base layer signal to noise ratio (SNR) may depend on the power split between a UE and one or more other UEs being grouped, the spatial layers being used for the base layer, and the spatial layers being used for the enhancement layer. Thus for each different TS, a UE may determine a different base layer CQI.

The enhancement layer CQI for a TS may be under the condition that a UE 115 is served using the enhancement layer under the given TS, where the demodulation happens after the base layer signal is demodulated and cancelled. The enhancement layer SNR may depend on the power split and spatial layers used for the enhancement layer. But the enhancement layer SNR may be independent of the spatial layer used for the base layer, as the base layer signal is cancelled. Thus the same enhancement layer CQIs may apply for multiple TSs, where the spatial layers of the enhancement layer are the same, but the spatial layers for the base layer are different.

The number of reported CQIs may be reduced by first reducing the number of TSs considered by a UE 115 in its CQI calculations. Reducing the number of TSs considered by the UE 115 may increase the probability of a base station determining a valid grouping of UEs under an MIMO or NOMA format. Reducing the number of TSs considered by the UE 115 may also lower the complexity of CQI computations for the UE 115. The base station 105 may perform scheduling of MIMO or NOMA transmissions to a UE 115 based on the CQI report from the UE 115.

Figure 1B:
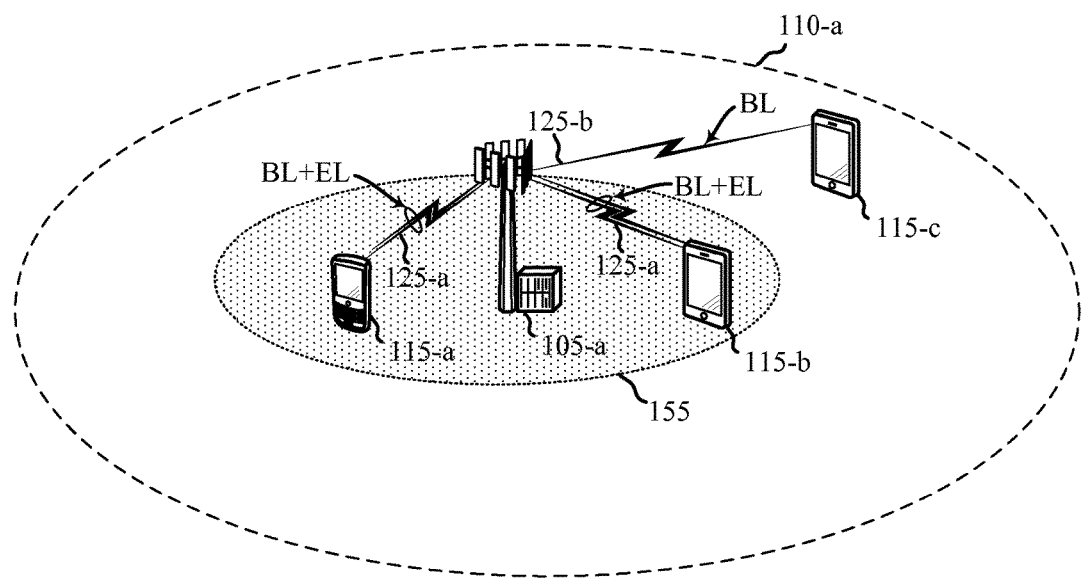
FIG. 1B illustrates a system in which a base station may communicate using MIMO and/or NOMA techniques, in accordance with various aspects of the disclosure.

As mentioned above, various aspects of the present disclosure are directed to transmissions on multiple layers. FIG. 1B illustrates a system 100-a in which a base station 105-a may communicate using MIMO and/or NOMA techniques, in accordance with various aspects of the disclosure. System 100-a may illustrate, for example, aspects of wireless communication system 100 illustrated in FIG. 1A. In the example of FIG. 1B, a base station 105-a may communicate with a number of UEs 115-a, 115-b, and 115-c within a coverage area 110-a of the base station 105-a. In this example, multiple layers may be employed for wireless communications. For example, one or more base layers and one or more enhancement layers may be concurrently transmitted over one or more spatial layers between the base station 105-a and the UEs 115. The base layer(s), according to some examples, may be transmitted with transmission parameters (e.g., higher transmission power) resulting in a relatively higher likelihood that the UEs 115 within the coverage area 110-a will be able to decode content transmitted on the base layer(s). The enhancement layer(s), according to various examples, may be transmitted with transmission parameters resulting in relatively lower reliability (e.g., lower transmission power, etc.) between the base station 105-a and UEs 115 as compared to the base layer(s). As such, transmissions on the enhancement layer(s), in order to have reliable reception and decoding, may be provided to UEs 115 having relatively good channel conditions.

As mentioned, the enhancement layer may have a lower likelihood of successful reception relative to the base layer, with the likelihood of successful reception largely dependent upon channel conditions between the base station 105-a and UEs 115. In some deployments, such as illustrated in FIG. 1B, UEs 115-a and 115-b may be located relatively close to base station 105-a in area 155, while UE 115-c may be located closer to a cell edge of the base station 105-a coverage area 110-a. If it is determined that UEs 115-a and 115-b located in area 155 have channel conditions conducive for hierarchical and/or superposition modulation, base station 105-a may signal to the UEs 115-a and 115-b that such communications may be employed. In such cases, communication links 125-a may include both a base layer and an enhancement layer, and UEs 115-a and 115-b may support communications on one or more of the layers. The UE 115 for which the enhancement layer is intended may perform interference cancellation of the base layer before decoding the enhancement layer.

Additionally or alternatively, UE 115-c, located closer to the cell edge of coverage area 110-a, and outside of area 155, may be signaled to communicate using only the base layer in communications link 125-b. While the communications link 125-b may still be transmitted with both the base and enhancement layers, UE 115-c may not attempt to decode the enhancement layer due to the relatively low likelihood of successful reception and decoding of content modulated on the enhancement layer. In this case, another UE (not shown) may receive communication link 125-b and may cancel the base layer such that it can receive the enhancement layer. In other examples, one or more of the UEs 115 may not have the capability to receive and decode enhancement layer transmissions, in which case the base layer is simply received and decoded according to established techniques.

Figure 2:
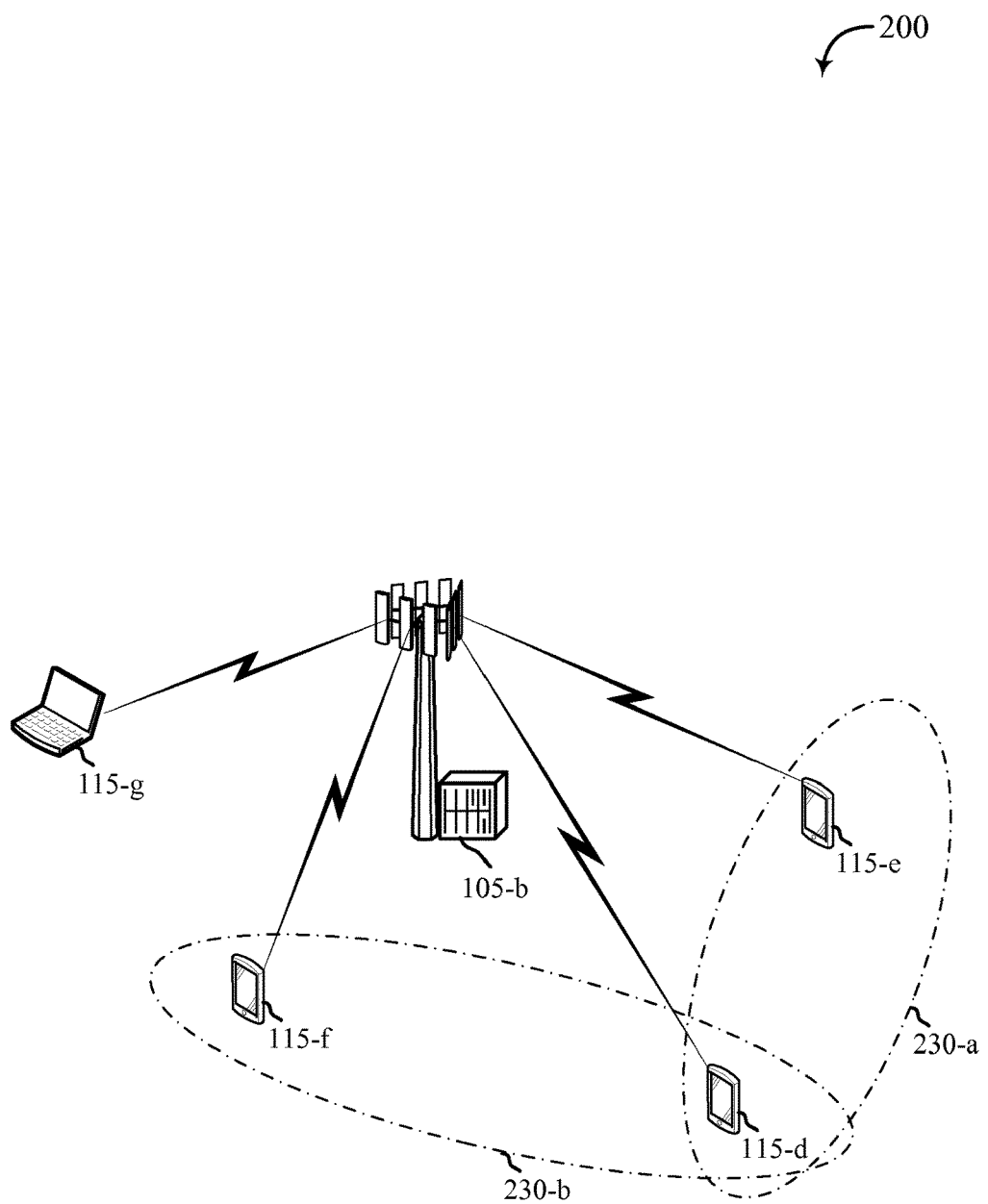
FIG. 2 shows an example wireless communications system that may employ channel feedback for enhanced scheduling over non-orthogonal channels, in accordance with various aspects of the disclosure.

FIG. 2 shows an example wireless communications system 200 that may employ channel feedback for enhanced scheduling over non-orthogonal channels, in accordance with various aspects of the disclosure. In system 200, UEs 115-d, 115-e, 115-f, and 115-g may be connected to a base station 105-b. The base station 105-b may configure transmission resources for UEs 115 in a number of ways. For example, the base station 105-b may pair or group UEs 115-d and 115-e for an MU-MIMO or NOMA transmission as illustrated by UE group 230-a. Alternatively, the base station 105-b may group UEs 115-d and 115-f for an MU-MIMO or NOMA transmission as illustrated by UE group 230-b. The base station 105-b may determine the groupings based at least in part on channel feedback reports from the UEs 115-d, 115-e, 115-f, and 115-g. For example, UE 115-d may report a CQI for a particular layer of a TS to the base station 105-b. If UE 115-e reports a CQI for a layer and TS that is complementary to the CQI reported for UE 115-d to the base station 105-b, then the base station 105-b may group UE 115-d and UE 115-e for MU-MIMO or NOMA downlink transmissions.

MU-MIMO downlink transmissions may use a certain number of antennas or antenna ports (e.g., 2TX, 4TX, etc.). For 2TX, the TSs may use one of two precoding matrices, $$P_0 = \frac{1}{\sqrt{2}}\begin{bmatrix} 1 & 1 \\ 1 & -1 \end{bmatrix} \text{ and } P_1 = \frac{1}{\sqrt{2}}\begin{bmatrix} 1 & 1 \\ j & -j \end{bmatrix}.$$

NOMA techniques may be applied where spatial layers are shared, resulting in nine combinations of two spatial layers for each precoding matrix. The nine combinations include the UEs using different spatial layers, each UE using spatial layer 0 only, each UE using spatial layer 1 only, or one or both UEs using both spatial layers. The TSs may also use different base layer and enhancement layer power splits, resulting in more potential combinations. Reporting feedback for all combinations for the base layer and enhancement layer under various power split conditions and different spatial layers may result in burdensome measurement and reporting overhead.

Each UE 115 may consider a measurement set of TSs to achieve a high probability of being grouped by the base station 105 for MU-MIMO and/or NOMA transmissions. The measurement set may be selected based on a set of TS selection criteria. For example, a predefined or configurable set of power-split ratios may be used, which may depend on spatial layer usage. The power split between the grouped UEs may be 50%-50% when there is no shared spatial layer. Otherwise, the power split between the grouped UEs may be given by one or more predetermined values (e.g., 80%-20%, 70%-30%, etc.). Each UE may consider seven combinations for spatial layer usage: (0-0), (1-1), (0-1), (1-0), (0-01), (1-01), and (01-01), where the first number denotes the spatial layers used for base layer transmissions under a given TS, and the second number denotes the spatial layer(s) for enhancement layer transmissions in the given TS, respectively. For example, a TS with spatial layer usage (0-01) indicates that layer 0 is used for a base layer transmission, while layers 0 and 1 are used for enhancement layer transmissions (e.g., transmissions assuming interference cancellation of one or more other layers). The measurement set may include base layer and enhancement layer CQIs for each of the spatial layer combinations, as discussed below. In some examples, TSs corresponding to spatial layer combinations (0-0) and (1-1) may be omitted from the measurement set.

Thus, for 2TX, the measurement set may include 14 base layer CQIs (corresponding to TSs using two precoding matrices, each with seven spatial layer combinations). The base layer CQIs for spatial layer combinations (0-0), (1-1), (0-01), (1-01), (01-01) may be calculated assuming 80% power, and the base layer CQIs for spatial layer combinations (0-1) and (1-0) may be calculated assuming 50% power. The UE may calculate enhancement layer CQIs without accounting for the spatial layer usage of the base layer (e.g., assuming interference cancellation of the base layer). Thus, the measurement set may also include 10 enhancement layer CQIs corresponding to TSs using two precoding matrices, each with three spatial layer combinations (e.g., enhancement layer(s) on spatial layer 0, spatial layer 1, and both spatial layers) calculated assuming 20% power, and enhancement layer CQIs for each spatial layer assuming 50% power. That is, the CQIs for spatial layer combinations (0-1) and (1-0) may be provided assuming no interference cancellation (e.g., base layer CQI) and assuming interference cancellation (e.g., enhancement layer CQI). In other examples, enhancement layer CQIs for spatial layer combinations (0-1) and (1-0) may be dropped, resulting in 6 enhancement layer CQIs reported. Although described with reference to a single predetermined power split ratio for shared spatial layers, it should be understood that the measurement set may be expanded with additional ratios to provide more scheduling flexibility.

For 4TX, the TSs may use 4×4 precoding matrices. Based on multipath propagation conditions, base layer and enhancement layer UEs may each determine a set of spatial layers. In some examples 16 4×4 precoding matrices may be defined. However, usage of a subset of the predefined precoding matrices for 4TX MU-MIMO and/or NOMA may be extended to result in a fewer number of 4×4 precoding matrices to select from for spatial layer, base layer, and/or enhancement layer assignment. The subset may be matrices that are used for lower rank transmissions or independent of each other. Selecting the subset may result in effectively five 4×4 precoding matrices. For each precoding matrix, there may be 225 combinations of spatial layers for the enhancement layer and the base layer. The 225 combinations are the cross product of the base layer and enhancement layer with each using any subset of four spatial layers. There may be one set of TSs for each power split between the base layer and enhancement layer. Although described with reference to a single predetermined power split ratio for shared spatial layers, it should be understood that the measurement set may be expanded with additional ratios to provide more scheduling flexibility.

Each UE 115 may apply TS selection criteria to select a measurement set of TSs to achieve a high probability of being grouped by the base station 105-*b* for MU-MIMO and/or NOMA. In some examples of MU-MIMO and/or NOMA using 4TX, the measurement set may include 250 base layer CQIs (corresponding to TSs using five precoding matrices, each with 50 spatial layer combinations). The measurement set may also include 70 enhancement layer CQIs (corresponding to TSs using five precoding matrices, each with 14 spatial layer combinations).

In some examples of MU-MIMO and/or NOMA using 4TX, the UEs 115 may determine a measurement set of TSs where the base layer and the enhancement layer use non-overlapping spatial layer sets. This condition may reduce the measurement set of TSs to 50 for each precoding matrix. The power split between two UEs for these TSs may be 50%-50%.

The total amount of CQI reports sent to the base station 105-*b* may be reduced by determining a subset of the measurement set of TSs to report. However, reducing the size of the subset (e.g., a subset of one CQI) may reduce the probability of a valid grouping being found by the base station 105-*b*. In order for the base station 105-*b* to find a valid grouping, the base station 105-*b* may obtain a base layer CQI from one UE and an enhancement layer CQI from another UE, under the same TS, to group them. If the subset of reported CQIs is smaller, then the base station 105-*b* may obtain CQIs from a larger number of UEs to find a valid grouping.

Each CQI report may include four bits for the CQI itself. Each CQI report may also include an indication of the TS corresponding to the CQI. The indication of the TS may be considered an addressing of a TS space. The indication may be an explicit addressing, an implicit addressing, or a mix of implicit and explicit addressing.

Implicit addressing occurs when both the base station 105-*b* and a UE are aware of the subset of TSs associated the reported CQIs. For example, either the base station 105-*b* or the UE may decide on a predetermined number M of CQIs that will be reported and inform the other party before the CQI reports are sent. For example, the base station 105-*b* and the UE may agree on a predefined order of TSs for reporting CQIs, then the UE may report the M CQIs in the predefined order.

Explicit addressing occurs when, along with the CQI itself, the UE also includes an indication in the CQI report of the TS corresponding to the CQI. For example, the UE may indicate that a CQI corresponds to a TS where the UE is served with spatial layer 0 as base layer and interfered with spatial layer 1, under an equal power split. Further details on explicit, implicit, and mixed addressing are provided below.

In some examples, reporting selection criteria may be applied in determining the subset of the measurement set of TSs to report. In some examples, the reporting selection criteria may be a sequential selection criteria. The sequential selection criteria may include a data rate threshold and/or predetermined number of TSs for which to report CQI. For example, the highest M data rates for the measurement set of TSs may be reported. The highest M data rates may be determined by sorting the CQIs (base layer and enhancement layer) of the measurement set of TSs by data rates, then the CQIs with the highest M data rates may be reported. The value of M may be determined empirically (e.g., based on a number of served UEs, etc.) or by the amount of channel feedback that can be handled by either the UE or the base station.

Figure 3:
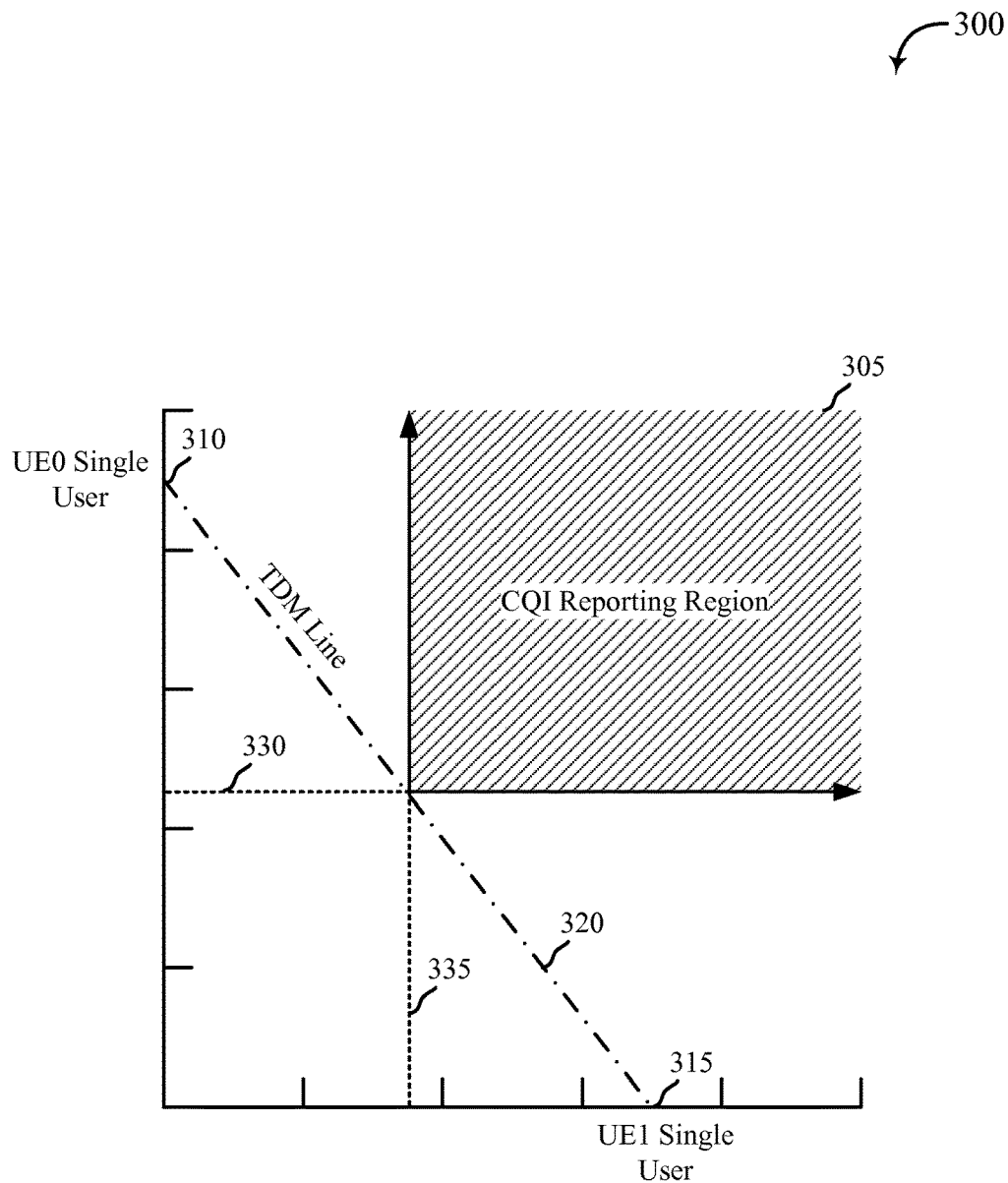
FIG. 3 is a diagram illustrating an example of a CQI reporting region, in accordance with various aspects of the disclosure.

Additionally or alternatively, UEs may apply data rate thresholds in determining the subset of the measurement set of TSs to report. FIG. 3 is a diagram 300 illustrating an example of a CQI reporting region 305, in accordance with various aspects of the disclosure. In diagram 300, a UE 0 may determine a possible single user data rate 310, and UE 1 may determine a possible single user data rate 315. Conceptually, a time division multiplexing (TDM) line 320 may connect the UE 0 single user data rate 310 and the UE 1 single user data rate 315. That is, for TSs grouping UE 0 and UE 1 that result in data rates below the TDM line, the same or better result may be obtained by a TDM scheme (using orthogonal techniques) rather than by applying the TS. However, when the UEs are determining CQIs for reporting, each UE may not be aware of which other UE it may be grouped with. Thus, each UE may use a minimum data rate threshold as a criterion for determining a subset of the measurement set of TSs to report, which may be based on its own single-user rate. In some examples, the minimum data rate threshold may be half the single-user rate. Thus, UE 0 may determine the TSs of the measurement set for which to report CQI by applying minimum data rate threshold 330, which may be half of the single user data rate 310. Similarly, UE 1 may determine the TSs of the measurement set for which to report CQI by applying minimum data rate threshold 335, which may be half of the single user data rate 315. If the TSs reported for UE 0 and UE 1 are complementary, the reported CQIs for UE 0 and UE 1 will then be in reporting region 305. Because the reporting region 305 is above the TDM line 320, applying the TS will result in a better aggregate data rate for UE 0 and UE 1 than applying TDM. Additional UEs may be grouped for a particular TS when each combination is determined to be separately above the TDM line 320 for the respective UEs. For example, a TS may group UE 0, UE 1, and UE 2 using spatial layer 0 for UE 0 and spatial layer 1 for UE 1 and UE 2 (e.g., using NOMA techniques). This combination may be advantageous where the combination of UE 0 and UE 1 or UE 2 for spatial layer splitting is above the TDM line 320 while the combination of UE 1 and UE 2 using NOMA is also above the TDM line 320 for spatial layer 1.

Additionally or alternatively, the reporting selection criteria may be a random selection criteria. For example, UEs may determine TSs of the measurement set for which to report CQI by randomly selecting M TSs of the measurement set. In some examples, the random selection criteria may include a minimum data rate threshold and a maximum data rate threshold. The minimum and maximum data rate thresholds may be based on a user rate for the UE (e.g., the highest single-user rate for each UE, a long-term signal-to-noise ratio (SNR), etc.). In some examples, the maximum data rate threshold may be the highest single-user rate for each UE, while the minimum data rate threshold may be based on proportion (e.g., 40%, 50%, etc.) of the highest single-user rate for the UE.

Each UE may identify the reporting selection criteria based on a filtered (e.g., long-term) SNR of the UE. For example, UEs having a relatively high long-term SNR may use random selection criteria while UEs having relatively lower long-term SNR may use sequential selection criteria. Using random selection criteria for UEs having relatively high long-term SNR increases the range of TSs for which CQI is reported, which may increase the probability of grouping the UE with another UE having a relatively lower long-term SNR for a transmission according to an MU-MIMO and/or NOMA TS. Alternatively, each UE may receive a selection mode from a base station indicating whether sequential selection criteria or random selection criteria is to be used. The base station may determine the selection mode based on the SNRs of some or all of the UEs being served by the base station.

Figure 4:
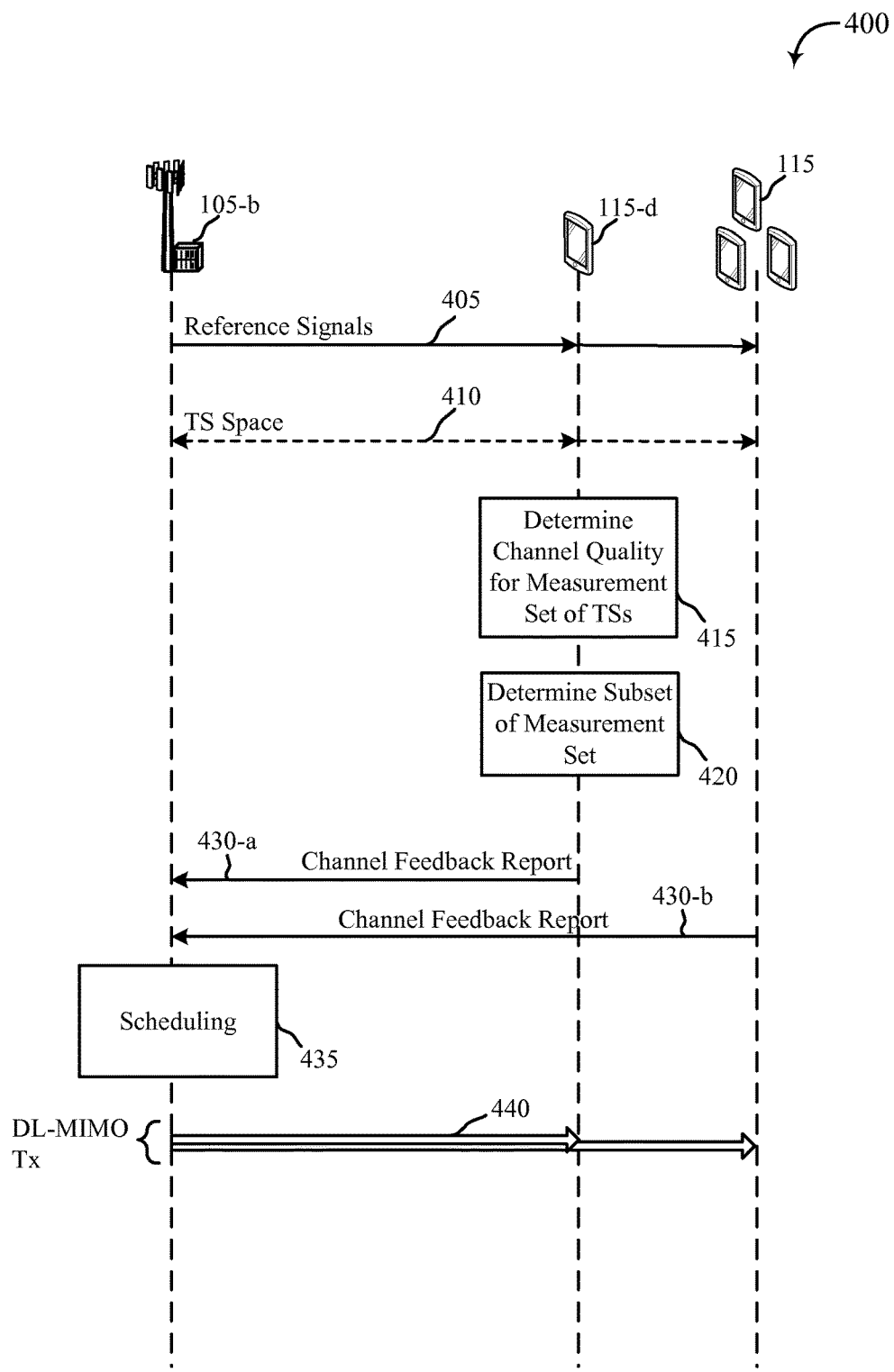
FIG. 4 illustrates an example message flow for a wireless communication system in accordance with various aspects of the disclosure.

FIG. 4 illustrates an example message flow 400 for a wireless communication system in accordance with various aspects of the disclosure. FIG. 4 illustrates channel feedback for non-orthogonal channels for UE 115-$d$ and other UEs 115, which may include, for example, UEs 115-$e$, 115-$f$, and 115-$g$ as illustrated in system 200 of FIG. 2.

The base station 105-$b$ may transmit reference signals 405, which may include CRS, CSI-RS, and/or UE-RS and may include multiple reference signals of the same type transmitted from different antenna ports. The UE 115-$d$ may determine a measurement set of TSs and estimate channel quality for each of the TSs of the measurement set at 415 based at least in part on the reference signals 405. The UE 115-$d$ may then determine a subset of the TSs at 420 and corresponding channel quality estimates to report to the base station 105-$b$. The subset may be determined based on the data rates of the channel quality estimates of the measurement set and reporting selection criteria as described above with reference to FIG. 2 or 3. In some examples, the base station 105-$b$ and UEs 115 may communicate a TS space 410, which may be a subset of available TSs and may correspond, for example, to the measurement set.

The UE 115-$d$ may then send a channel feedback report 430-$a$ to the base station 105-$b$. Channel feedback report 430-$a$ may use explicit addressing for indicating the TSs corresponding to the reporting CQI values of the subset of TSs reported. In explicit addressing, the channel feedback report 430-$a$ may also include indicators of the TSs corresponding to each CQI being reported in the channel feedback report 430-$a$ (e.g., the subset of TSs). Thus, the UE 115-$d$ may have freedom to choose which TS and corresponding CQI to report.

Figure 6A:
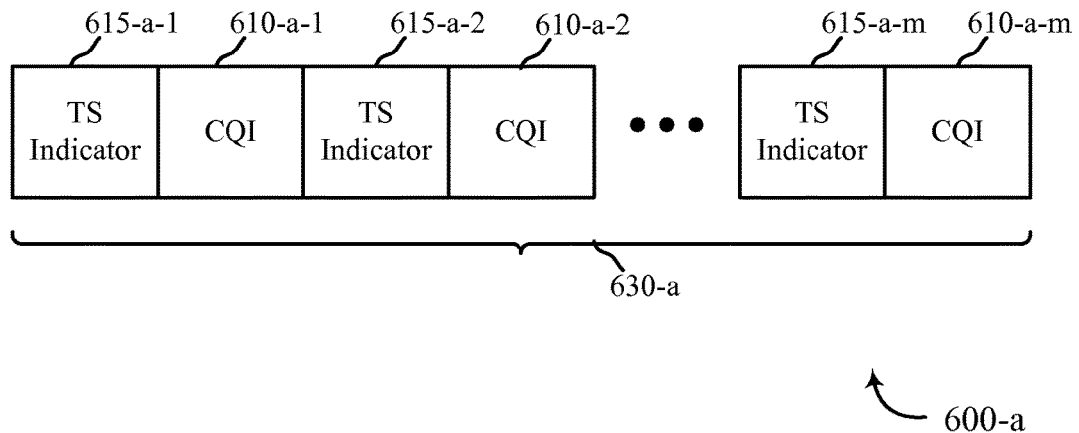
FIG. 6A shows a block diagram of an example of explicit addressing, in accordance with various aspects of the disclosure.

FIG. 6A shows a block diagram 600-$a$ of an example of explicit addressing, in accordance with various aspects of the disclosure. Block diagram 600-$a$ shows a channel feedback report 630-$a$, which may illustrate aspects of channel feedback report 430-$a$ of FIG. 4, for example. With explicit addressing, channel feedback report 630-$a$ may include a number (e.g., M) of TS indicator fields 615 and corresponding CQI fields 610. For example, the TS indicator fields 615-$a$-1, 615-$a$-2, . . . , 615-$a$-$m$ may provide an explicit indication of the TSs corresponding to the CQI fields 610-$a$-1, 610-$a$-2, . . . , 610-$a$-$m$, respectively.

For 2TX, each TS indicator field 615 may include one bit for indicating the two precoding matrices, and four bits for indicating the spatial layer combinations and base layer or enhancement layer (seven combinations for base layer and five combinations for enhancement layer). Therefore, for each reported CQI field 610, the channel feedback report 630-$a$ may include five bits for each corresponding TS indicator field 615.

For 4TX, each TS indicator field 615 may include two bits for indicating the four precoding matrices (or three bits for up to eight precoding matrices), and six bits for indicating the spatial layer combinations and base layer or enhancement layer (50 combinations for base layer and 14 combinations for enhancement layer). Therefore, the channel feedback report 630-$a$ may include eight bits for a TS indicator field 615.

Figure 6B:
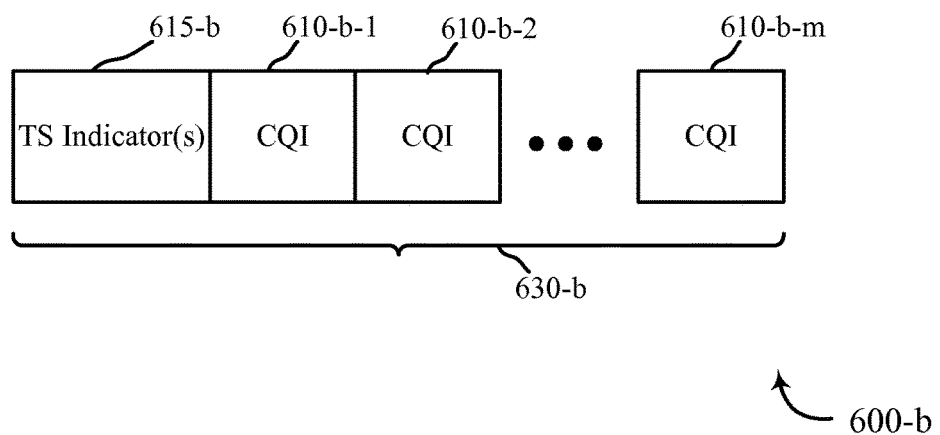
FIG. 6B shows a block diagram of an example of explicit addressing using compressed transmission strategy indicators, in accordance with various aspects of the disclosure.

Block diagram 600-$a$ shows one TS indicator field 615 for each CQI field 610. When the subset includes multiple TSs, the indicators for the multiple TSs may be compressed. FIG. 6B shows a block diagram 600-$b$ of an example of explicit addressing using compressed TS indicator fields, in accordance with various aspects of the disclosure. Block diagram 600-$b$ shows a channel feedback report 630-$b$, which may illustrate aspects of channel feedback report 430-$a$ of FIG. 4, for example. In block diagram 600-$b$, channel feedback report 630-$b$ includes TS indicator field 615-$b$, which may provide a compressed indication of the TSs reported in CQI fields 610-$b$-1, 610-$b$-2, . . . , 610-$b$-$m$.

As discussed above, a TS space for 2TX may include 24 available TSs, based on a single power split ratio for shared spatial layers. If M=2, then the UE may have $$\binom{24}{2} = 276$$

choices for the subset of TSs of the TS space to be reported, which may be indicated with nine bits. If M=3, then the UE may have $$\binom{24}{3} = 2024$$

choices for the subset of TSs, which may be indicated with 11 bits. If M is very large, a bit mask of length 24 (1 bit corresponding to each TS in the TS space) may be used to indicate whether the CQI corresponding to each TS is reported.

For 4TX, if M=2, then the UE may have $$\binom{256}{2} = 32640$$

choices for the subset of TSs, which may be indicated with 15 bits. If M=3, then the UE may have $$\binom{256}{3} = 2763520$$

choices for the subset of TSs, which may be indicated with 22 bits. If M is very large, a bit mask of length 256 (one bit corresponding to each TS in the TS space) may be used to indicate whether the CQI corresponding to each TS is reported.

Referring back to FIG. 4, channel feedback report 430-a may use implicit addressing of the subset of TSs reported. Implicit addressing may occur when both the base station 105-b and the UE 115-d agree on the subset of TSs and order of CQI values to be reported. For example, the base station 105-b and UE 115-d may exchange a TS space 410. The channel feedback report 430-a may include indicators of the channel quality (e.g., CQIs) for the TS space 410.

Figure 7:
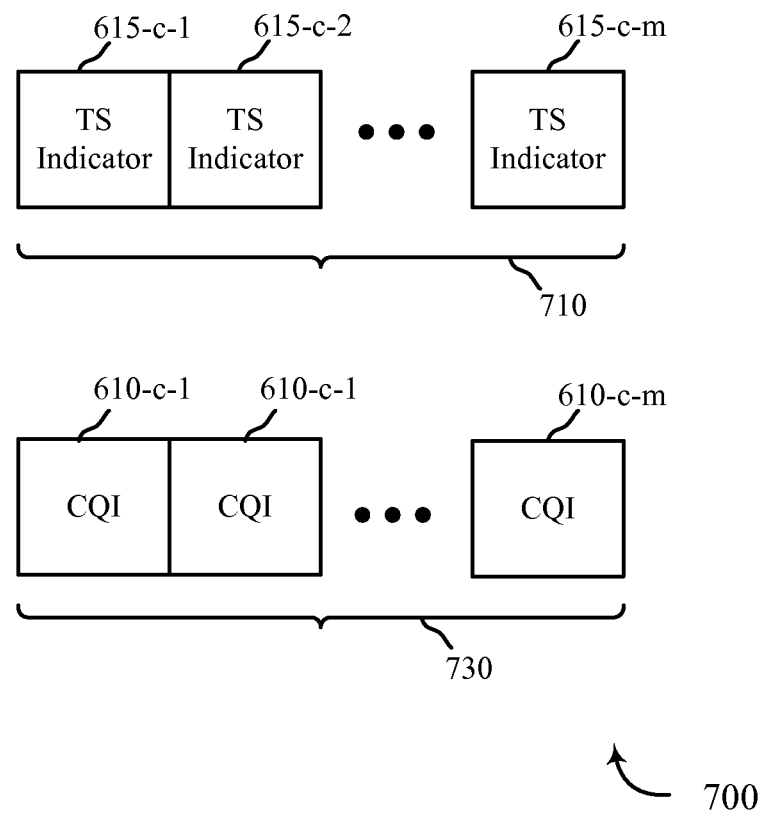
FIG. 7 shows a block diagram of an example of implicit addressing, in accordance with various aspects of the disclosure.

FIG. 7 shows a block diagram 700 of an example of implicit addressing, in accordance with various aspects of the disclosure. Block diagram shows 700 shows TS space 710, which may illustrate aspects of the TS space 410 of FIG. 4, for example.

The order of the TS fields 615 in TS space 710 may provide an implicit indication of the TS that corresponds to a CQI field 610 in the channel feedback report 730. For example, channel feedback report 730 may include CQI fields 610-c-1, 610-c-2, . . . , 610-c-m, which may correspond to TS fields 615-c-1, 615-c-2, . . . , 615-c-m of TS space 710, respectively. Implicit addressing may allow for efficient CQI reporting as no corresponding TS indicator fields are needed in the channel feedback report 730. Instead, the base station 105 may determine the TS corresponding to each CQI field in the channel feedback report 730 based on the order in which the CQI fields are reported. The TS space 710 may be sent less often than the channel feedback report 730.

Returning to FIG. 4, when the base station 105-b determines the TS space 410, the base station 105-b may require some other form of channel feedback. When the UE 115-d decides the TS space 410, the base station 105-b may provide one or more selection criteria for determining TS space 410. The TS space 410 may be updated at a rate slower than the channel feedback report 430-a. For example, the base station 105-b or UE 115 may monitor the channel and semi-statically update the TS space 410. For example, the TS space 410 may be updated through higher layer signaling (e.g., RRC signaling, MAC control signaling, etc.).

The other UEs 115 served by base station 105-b may also exchange TS spaces 410 and provide channel feedback reports 430-b. The base station 105-b may perform scheduling 435 to optimize performance based on the channel feedback reports 430. Scheduling 435 may include using the channel feedback reports 430 to determine a valid grouping of UEs 115 for transmissions over the non-orthogonal channels to the UEs 115. For example, the base station 105-b may determine a grouping that includes UE group 230-a for MU-MIMO or a grouping that includes UE group 230-b for MU-MIMO as illustrated in FIG. 2. The base station 105-b may then transmit DL transmissions 440 to UEs 115 served by the base station 105-b based on the CQIs in the received channel feedback reports 430. DL transmissions 440 may include single-user transmissions (e.g., FDMA, SU-MIMO, etc.) and/or multiple-user transmissions (e.g., NOMA, MU-MIMO, etc.).

For ease of illustration, FIG. 4 illustrates the TS space 410 and channel feedback reports 430 occurring at the same time for multiple UEs 115. However, it should be understood that the TS spaces 410 and channel feedback reports 430 may be exchanged at different times with different UEs. Further, FIG. 4 illustrates an example of a transmission 440 based on channel feedback reports 430-a and 430-b. However, it should be understood that the base station 105-b may continually schedule transmissions (e.g., for subsequent frames or sub-frames, etc.) over the non-orthogonal channels based on additional channel feedback reports 430.

Figure 5:
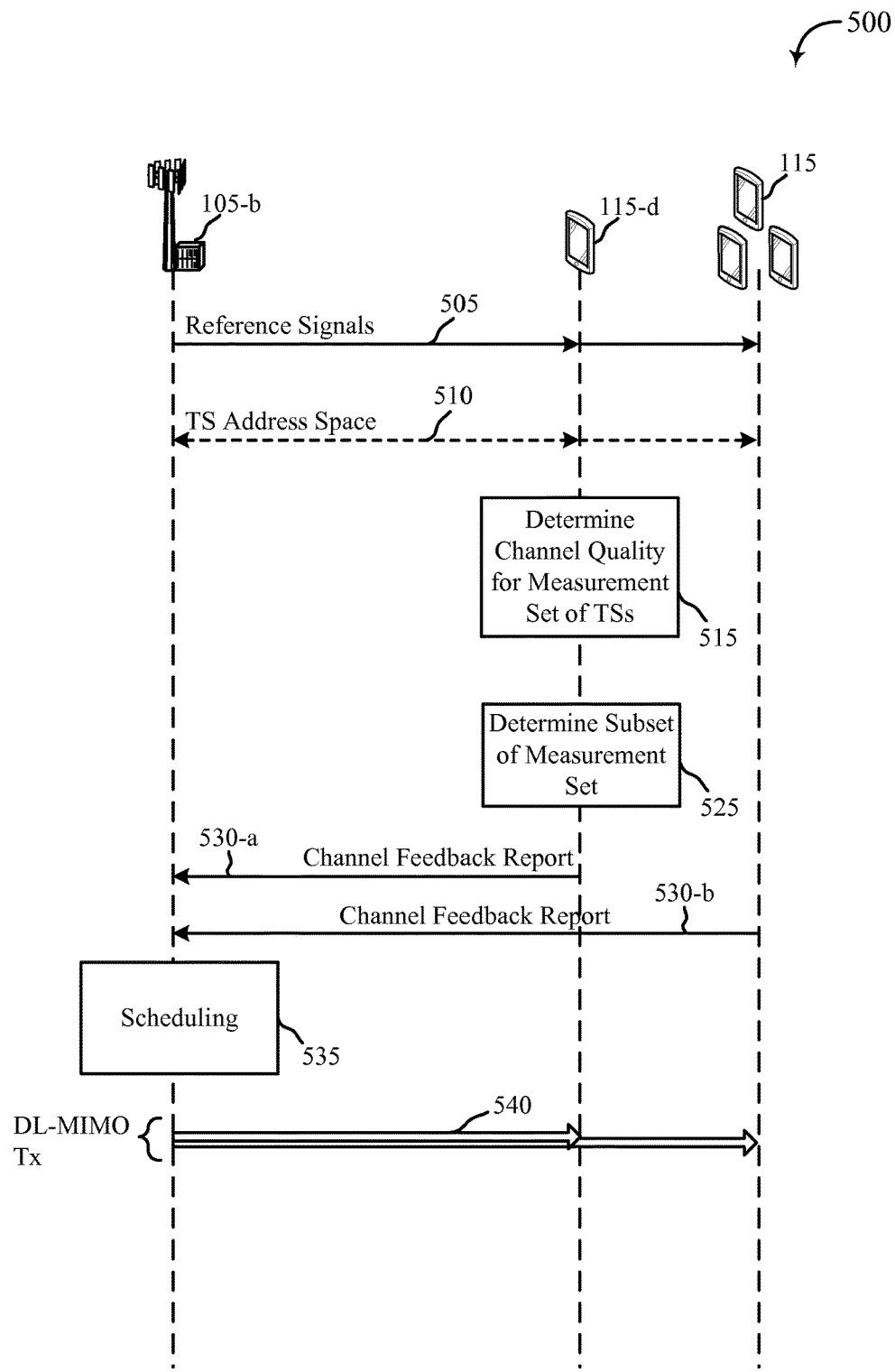
FIG. 5 illustrates another example message flow for a wireless communication system, in accordance with various aspects of the disclosure.

FIG. 5 illustrates another example message flow 500 for a wireless communication system, in accordance with various aspects of the disclosure. FIG. 5 illustrates channel feedback for non-orthogonal channels for UE 115-d and other UEs 115, which may include, for example, UEs 115-e, 115-f, and 115-g as illustrated in system 200 of FIG. 2.

The base station 105-b may transmit reference signals 505, which may include CRS, CSI-RS, and/or UE-RS and may include multiple reference signals of the same type transmitted from different antenna ports. The base station 105-b and UE 115-d may exchange a TS address space 510. The TS address space 510 may include a list of TSs and associated indexes to use for CQI reporting.

Figure 8A:
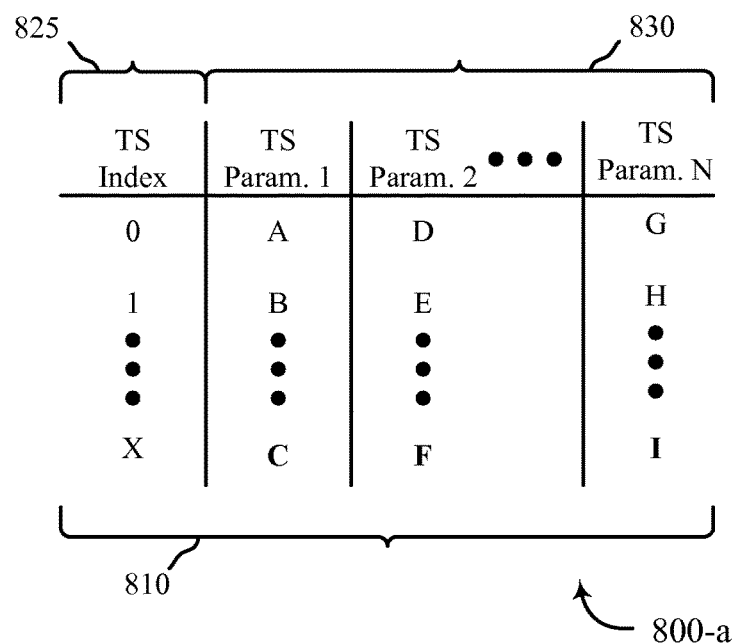
FIG. 8A shows a table illustrating a transmission strategy address space for mixed addressing, in accordance with various aspects of the disclosure.

FIG. 8A shows a table 800-a illustrating a TS address space 810, in accordance with various aspects of the disclosure. TS address space 810 may, for example, correspond to TS address space 510 of FIG. 5. TS address space 810 includes TS indexes 825, which may each be associated with a TS 830. Each TS 830 may include a set of TS parameters relevant to the TS. TS parameters may include, for example, a precoding matrix, a first set of spatial layers for data streams to the UE, a second set of spatial layers for data streams to at least one other UE, whether interference cancellation is applied to achieve a respective channel quality, a power split ratio, and the like.

Returning to FIG. 5, the UE 115-d may determine the measurement set of TSs and estimate channel quality for each of the TSs of the measurement set at 515 based at least in part on the reference signals 505. In some examples, the measurement set of TSs may be based at least in part on the received TS address space 510 (e.g., the measurement set of TSs may include all or a subset of TSs in the TS address space 510, etc.).

The UE 115-d may then determine a subset of the TSs and corresponding channel quality estimates to report to the base station 105-b at 525. The subset may be determined based on the data rates of the channel quality estimates of the measurement set and reporting selection criteria as described above with reference to FIG. 2 or 3.

Figure 8B:
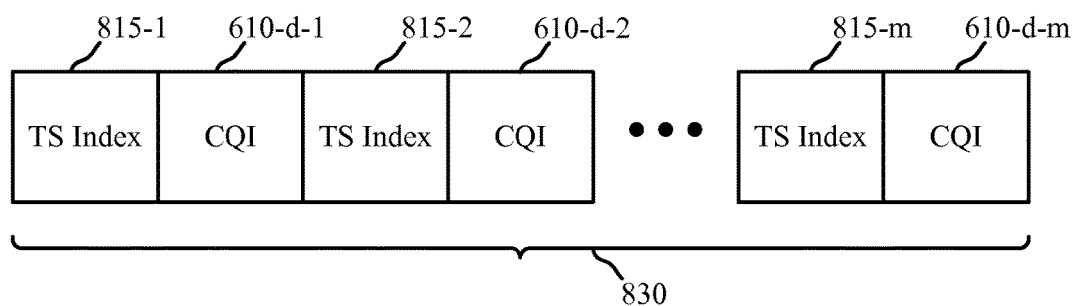
FIG. 8B shows a block diagram of an example of a channel feedback report for mixed addressing, in accordance with various aspects of the disclosure.

The UE 115-d may then send a channel feedback report 530-a to the base station 105-b. The channel feedback report 530-a may include CQI fields corresponding to the subset of TSs. FIG. 8B shows a block diagram 800-b of an example of a channel feedback report 830 for mixed addressing, in accordance with various aspects of the disclosure. Channel feedback report 830 may be, for example, the channel feedback report 530-a of FIG. 5. The channel feedback report 830 may include indexes corresponding to addresses in the TS address space 810 for each TS in the subset of TSs. For example, the UE 115 may be configured with a TS address space 810 as illustrated in table 800-a that includes 16 TSs, and may be configured to report eight CQI values (e.g., M=8). The channel feedback report 830 may indicate the reported TSs of the TS address space 810 by including an address index field 815 for each reported CQI field 610. For example, TS address index fields 815-1, 815-2, . . . , 815-m may correspond to CQI fields 610-d-1, 610-d-2, 610-d-m. Alternatively, channel feedback report 830 may use compression or a bit mask as described above with reference to FIG. 6B. For example, using a bit mask of length 16 to indicate which M CQIs are included in the channel feedback report 830. Where M is relatively large, the bit mask may be more efficient than including an address index for each reported CQI value. For example, using a bit mask, the channel feedback report 830 may use a total of 16+(8×4)=48 bits for indicating the TS corresponding to each CQI. In comparison, using explicit addressing for the 4TX case for each CQI for M=8 may use a total of (8×8)+(8×4)=96 bits to indicate the same TSs.

The other UEs 115 served by base station 105-b may also provide channel feedback reports 530-b. The base station 105-b may perform scheduling 535 to optimize performance based on the channel feedback reports 530. Scheduling 535 may include using the channel feedback reports 530 to determine a valid grouping of UEs for transmissions over the non-orthogonal channels to the UEs 115. For example, the base station 105-b may determine a grouping that includes UE group 230-a for MU-MIMO or a grouping that includes UE group 230-b for MU-MIMO as illustrated in FIG. 2. The base station 105-b may then transmit DL transmissions 540 to UEs 115 served by the base station 105-b based on the CQIs in the received channel feedback reports 530. DL transmissions 540 may include single-user transmissions (e.g., FDMA, SU-MIMO, etc.) and/or multiple-user transmissions (e.g., NOMA, MU-MIMO, etc.).

For ease of illustration, FIG. 5 illustrates the exchange of TS address spaces 510 and channel feedback reports 530 occurring at the same time for multiple UEs. However, it should be understood that the TS address spaces 510 and channel feedback reports 530 may be exchanged at different times with different UEs. Further, FIG. 5 illustrates an example of a transmission 540 based on channel feedback reports 530. However, it should be understood that the base station 105-b may continually schedule transmissions (e.g., for subsequent frames or sub-frames, etc.) based on additional channel feedback reports 530.

Figure 9:
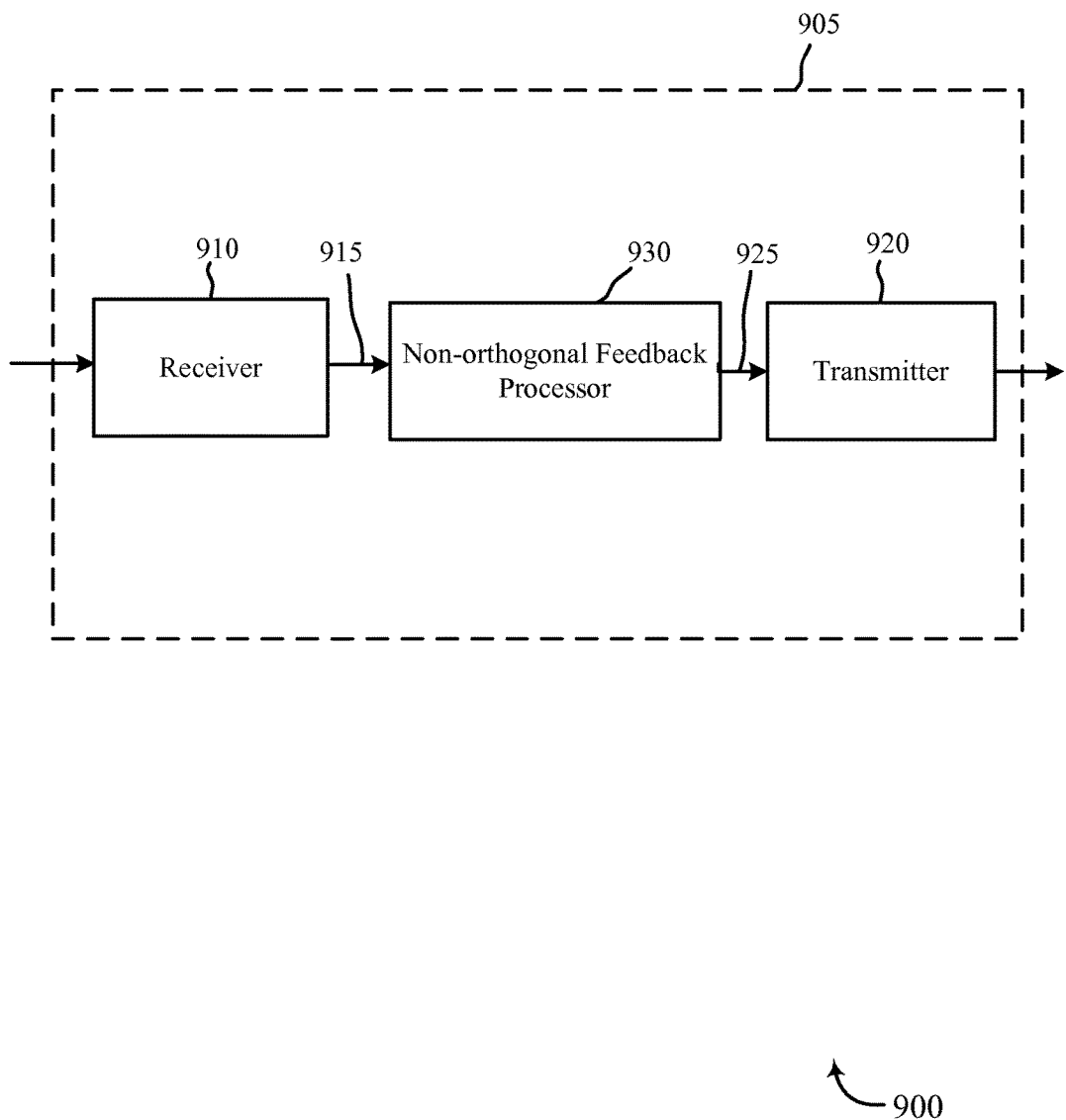
FIG. 9 shows a block diagram of a device for non-orthogonal channel feedback in wireless communication systems, in accordance with various aspects of the disclosure.

FIG. 9 shows a block diagram 900 of a device 905 for non-orthogonal channel feedback in wireless communication systems, in accordance with various aspects of the disclosure. The device 905 may be an example of one or more aspects of a UE 115 described with reference to FIG. 1A, 1B, 2, 4 or 5. The device 905 may include a receiver 910, a transmitter 920, and a non-orthogonal feedback processor 930. The device 905 may also be or include a processor (not shown). Each of these components may be in communication with each other.

The receiver 910 may include at least one radio frequency (RF) receiver operable to receive information such as packets, user data, and/or control information associated with various signals (e.g., reference signals, etc.) and/or information channels (e.g., control channels, data channels, etc.). The receiver 910 may have multiple antennas and be configured to receive, demodulate, and decode signals such as reference signals (e.g., CRS, CSI-RS, UE-RS, etc.) and TS information. The receiver 910 may pass the decoded signals 915 to the non-orthogonal feedback processor 930.

The non-orthogonal feedback processor 930 may determine a measurement set of TSs and estimate channel quality for downlink transmissions to the device 905 corresponding to respective TSs of the measurement set. The non-orthogonal feedback processor 930 may then generate a channel feedback report that includes indicators of the channel quality for a subset of the measurement set of TSs.

The transmitter 920 may include at least one RF transmitter operable to transmit the one or more signals 925 received from other components of the device 905 as described above. In some examples, the transmitter 920 may be collocated with the receiver 910 in a transceiver.

Figure 10:
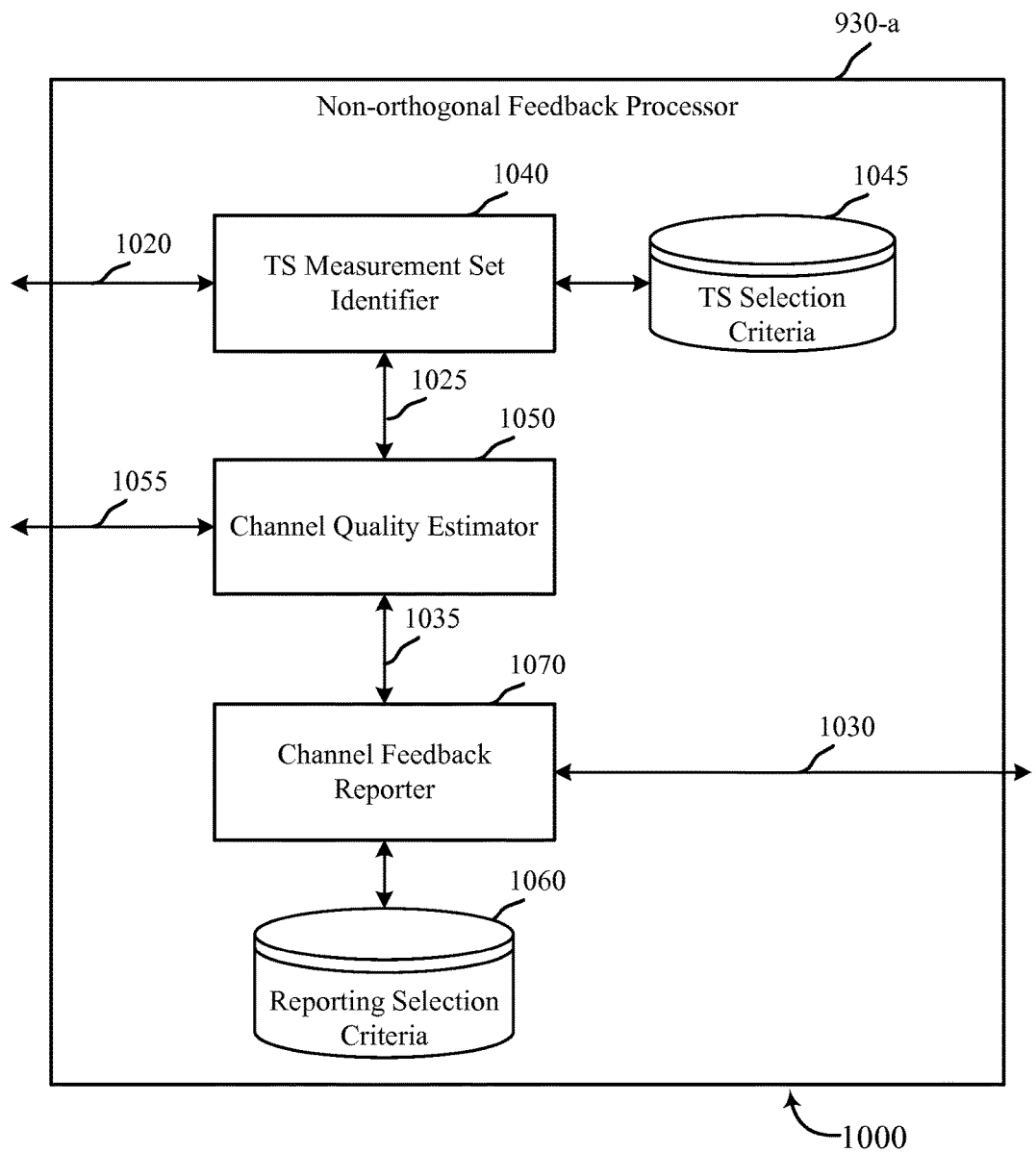
FIG. 10 shows a block diagram of a non-orthogonal feedback processor for channel feedback in wireless communication systems, in accordance with various aspects of the disclosure.

FIG. 10 shows a block diagram 1000 of a non-orthogonal feedback processor 930-a for channel feedback in wireless communication systems, in accordance with various aspects of the disclosure. non-orthogonal feedback processor 930-a may illustrate, for example, aspects of non-orthogonal feedback processor 930 of FIG. 9.

non-orthogonal feedback processor 930-a may include a TS measurement set identifier 1040, a channel quality estimator 1050, and a channel feedback reporter 1070. TS measurement set identifier 1040 may determine a measurement set 1025 of TSs for performing measurements and channel estimation for a non-orthogonal channel. TS measurement set identifier 1040 may apply a set of TS selection criteria 1045 to an available TS space to determine the measurement set 1025. The set of TS selection criteria 1045 may include any of power split selection criteria, spatial layer selection criteria for data streams transmitted to the device, spatial layer selection criteria for data streams transmitted to at least one other device, or combinations thereof. Each of the TSs may include any of a precoding matrix, a first set of spatial layers for data streams to the device, a second set of spatial layers for data streams to at least one other device, whether interference cancellation is applied to achieve a respective channel quality, a power split, or combinations thereof.

Channel quality estimator 1050 may perform channel estimation for the measurement set 1025 of TSs based on reference signal information 1055 (e.g., via receiver 910, etc.). Channel quality estimator 1050 may provide CQI information 1035 for the measurement set to channel feedback reporter 1070. Channel feedback reporter 1070 may report channel quality feedback for a subset of TSs of the measurement set 1025. The channel feedback reporter 1070 may determine the subset of the measurement set based on reporting selection criteria 1060 which may include sequential selection criteria or random selection criteria, as described above.

In some examples, the TS measurement set identifier 1040 may exchange (e.g., semi-statically) TS space information 1020 with a base station. TS space information 1020 may include, for example, a reporting order for implicit addressing of reported CQIs as discussed above with reference to FIG. 7, or a TS address space for mixed addressing as described above with reference to FIGS. 8A and 8B.

The channel feedback reporter 1070 may report CQIs for the subset of the measurement set using explicit addressing, implicit addressing, or mixed addressing, as discussed above. For example, the channel feedback reporter 1070 may send channel feedback reports 1030 (e.g., via transmitter 920, etc.), which may be formatted according to channel feedback reports 630, 730, or 830 discussed with reference to FIG. 6, 7, or 8.

Figure 11:
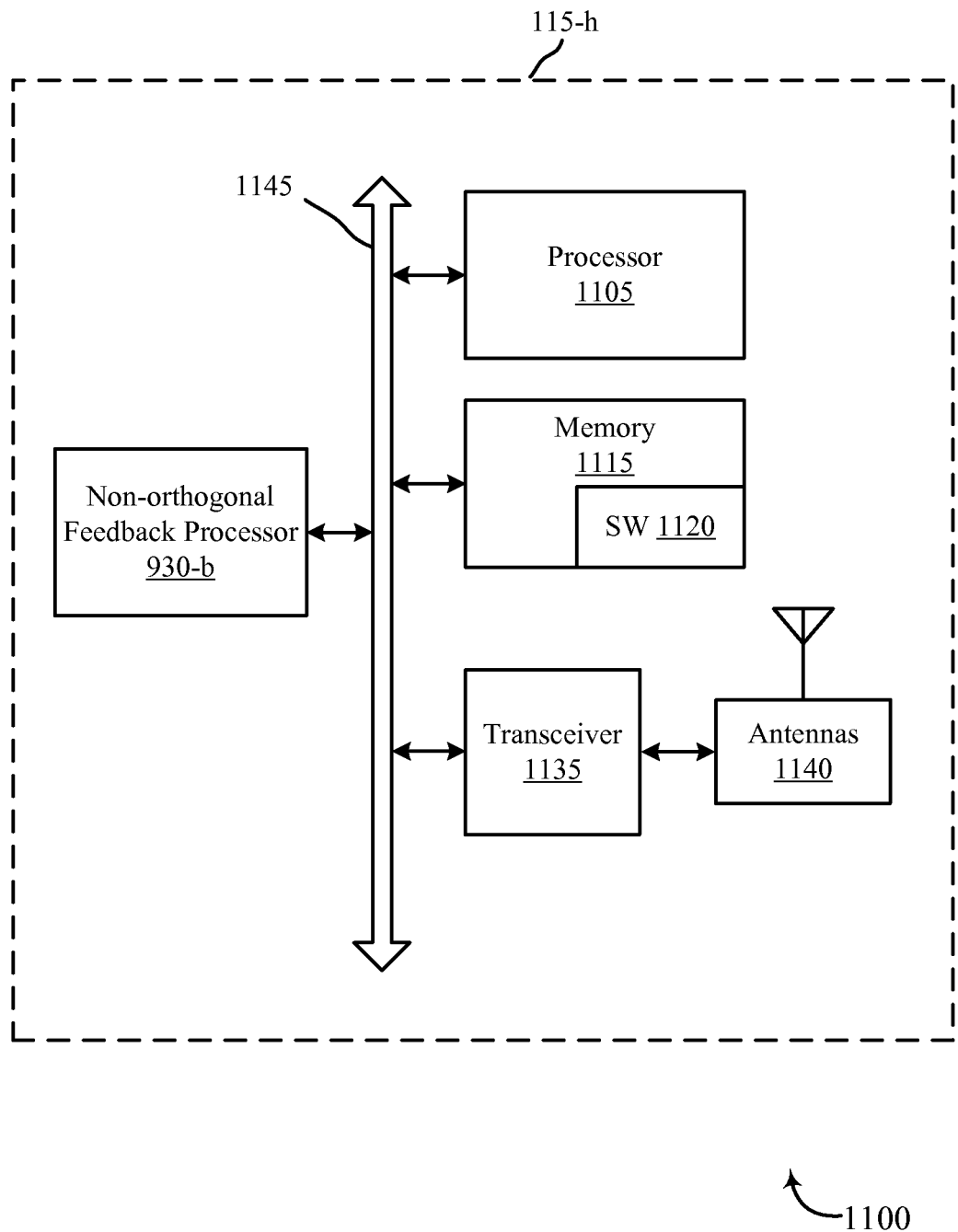
FIG. 11 shows a block diagram of a UE for wireless communication systems, in accordance with various aspects of the disclosure.

FIG. 11 shows a block diagram 1100 of a UE 115-*h* for wireless communication systems, in accordance with various aspects of the disclosure. UE 115-*h* may be an example of the UEs 115 of FIG. 1A, 1B, 2, 4 or 5. UE 115-*h* may also be an example of one or more aspects of device 905 of FIGS. 9 and 10.

The UE 115-*h* may generally include components for bi-directional voice and data communications including components for transmitting communications and components for receiving communications. The UE 115-*h* may include antenna(s) 1140, transceiver(s) 1135, processor(s) 1105, and memory 1115 (including software (SW) 1120), which each may communicate, directly or indirectly, with each other (e.g., via one or more buses 1145). The transceiver(s) 1135 may be configured to communicate bi-directionally, via the antenna(s) 1140 and/or one or more wired or wireless links, with one or more networks, as described above. For example, the transceiver(s) 1135 may be configured to communicate bi-directionally with base stations 105 and/or other UEs 115. The transceiver(s) 1135 may include a modem configured to modulate the packets and provide the modulated packets to the antenna(s) 1140 for transmission, and to demodulate packets received from the antenna(s) 1140. The UE 115-*h* may have multiple antennas 1140 capable of concurrently transmitting and/or receiving multiple wireless transmissions (e.g., MIMO transmissions, etc.). The transceiver(s) 1135 may be capable of concurrently communicating with one or more base stations 105 via multiple component carriers.

The UE 115-*h* may include an Non-orthogonal feedback processor 930-*b*, which may be configured to perform and/or control some or all of the features and/or functions described above with reference to FIGS. 9 and 10 related to determining TSs, determining CQIs corresponding to the TSs, and reporting the CQIs and/or TSs to a base station. In some examples, non-orthogonal feedback processor 930-*b* may be part of the software/firmware code 1120 and may include instructions that are configured to cause the processor 1105 to perform various functions described herein (e.g., determining a subset of TSs, reporting the subset of TSs and/or corresponding CQIs using implicit addressing, explicit addressing, or mixed addressing, etc.). The non-orthogonal feedback processor 930-*b* may be an example of the non-orthogonal feedback processors 930 described with reference to FIGS. 9 and 10.

The memory 1115 may include random access memory (RAM) and read-only memory (ROM). The memory 1115 may store computer-readable, computer-executable software/firmware code 1120 containing instructions that are configured to, when executed, cause the processor(s) 1105 to perform various functions described herein. Alternatively, the computer-readable, computer-executable software/firmware code 1120 may not be directly executable by the processor(s) 1105 but be configured to cause a computer (e.g., when compiled and executed) to perform functions described herein. The processor(s) 1105 may include an intelligent hardware device, e.g., a central processing unit (CPU), a microcontroller, an application-specific integrated circuit (ASIC), etc.

Figure 12:
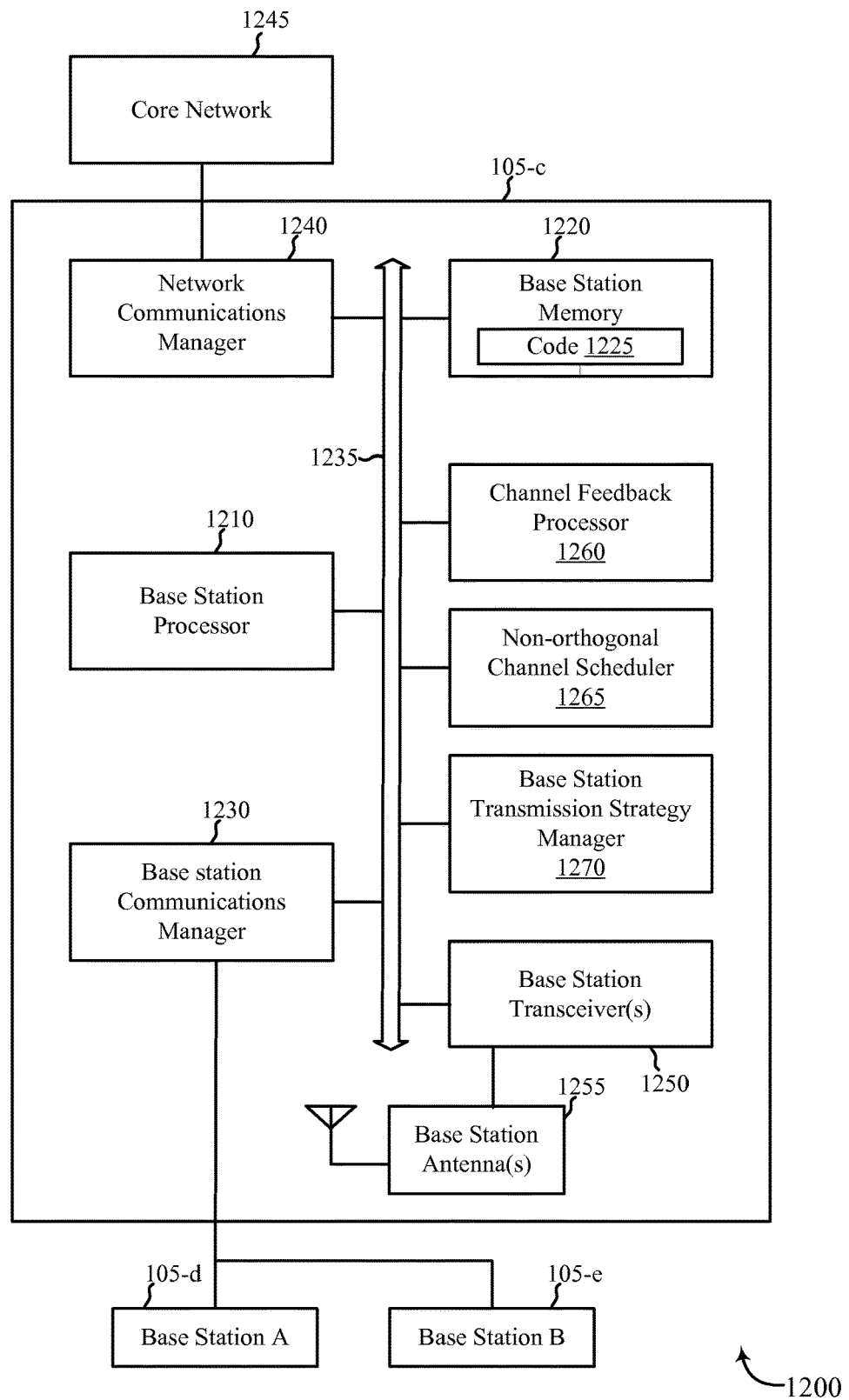
FIG. 12 shows a block diagram of a base station for a wireless communication system, in accordance with various aspects of the disclosure.

FIG. 12 shows a block diagram 1200 of a base station 105-*c* (e.g., a base station forming part or all of an eNB) for a wireless communication system, in accordance with various aspects of the disclosure. In some examples, the base station 105-*c* may be an example of aspects of one or more of the base stations 105 described with reference to FIGS. 1-7. The base station 105-*c* may be configured to implement or facilitate at least some of the base station and/or apparatus features and functions described with reference to FIGS. 1-7.

The base station 105-*c* may include a base station processor 1210, base station memory 1220 (including software/firmware code 1225), one or more base station transceiver(s) 1250, one or more base station antenna(s) 1255. The base station 105-*c* may also include one or more of a base station communications manager 1230 and/or a network communications manager 1240. Each of these components may be in communication with each other, directly or indirectly, over one or more buses 1235.

The base station 105-*c* may include a channel feedback processor 1260, a non-orthogonal channel scheduler 1265, and a base station TS manager 1270. The channel feedback processor 1260 may group UEs for transmissions over non-orthogonal channels based on received CQIs and corresponding TSs, as described above with reference to FIGS. 1-7. The non-orthogonal channel scheduler 1265 may schedule transmissions, as described above with reference to FIGS. 1-7. The base station TS manager 1270 may determine TS space addresses and predefined orders, as described above with reference to FIGS. 1-7. In some examples, channel feedback processor 1260, non-orthogonal scheduler 1265, and base station TS manager 1270 may be part of the software/firmware code 1225 and may include instructions that are configured to cause the base station processor 1210 to perform various functions described herein.

The base station memory 1220 may include random access memory (RAM) and/or read-only memory (ROM). The base station memory 1220 may store computer-readable, computer-executable software/firmware code 1225 containing instructions that are configured to, when executed, cause the base station processor 1210 to perform various functions described herein. Alternatively, the computer-readable, computer-executable software/firmware code 1225 may not be directly executable by the base station processor 1210 but be configured to cause the base station 105-*c* (e.g., when compiled and executed) to perform various of the functions described herein.

The base station processor 1210 may include an intelligent hardware device, e.g., a central processing unit (CPU), a microcontroller, an ASIC, etc. The base station processor 1210 may process information received through the base station transceiver(s) 1250, the base station communications manager 1230, and/or the network communications manager 1240. The base station processor 1210 may also process information to be sent to the transceiver(s) 1250 for transmission through the antenna(s) 1255, to the base station communications manager 1230, for transmission to one or more other base stations 105-*d* and 105-*e*, and/or to the network communications manager 1240 for transmission to a core network 1245, which may be an example of one or more aspects of the core network 130 described with reference to FIG. 1.

The base station transceiver(s) 1250 may include a modem configured to modulate packets and provide the modulated packets to the base station antenna(s) 1255 for transmission, and to demodulate packets received from the base station antenna(s) 1255. The base station transceiver(s) 1250 may, in some examples, be implemented as one or more base station transmitters and one or more separate base station receivers. The base station transceiver(s) 1250 may be configured to communicate bi-directionally, via the antenna(s) 1255, with one or more UEs or apparatuses, such as one or more of the UEs 115 described with reference to FIGS. 1-7. The base station 105-c may, for example, include multiple base station antennas 1255 (e.g., an antenna array). The base station 105-c may communicate with the core network 1245 through the network communications manager 1240. The base station 105-c may also communicate with other base stations, such as the base stations 105-d and 105-e, using the base station communications manager 1230.

Figure 13:
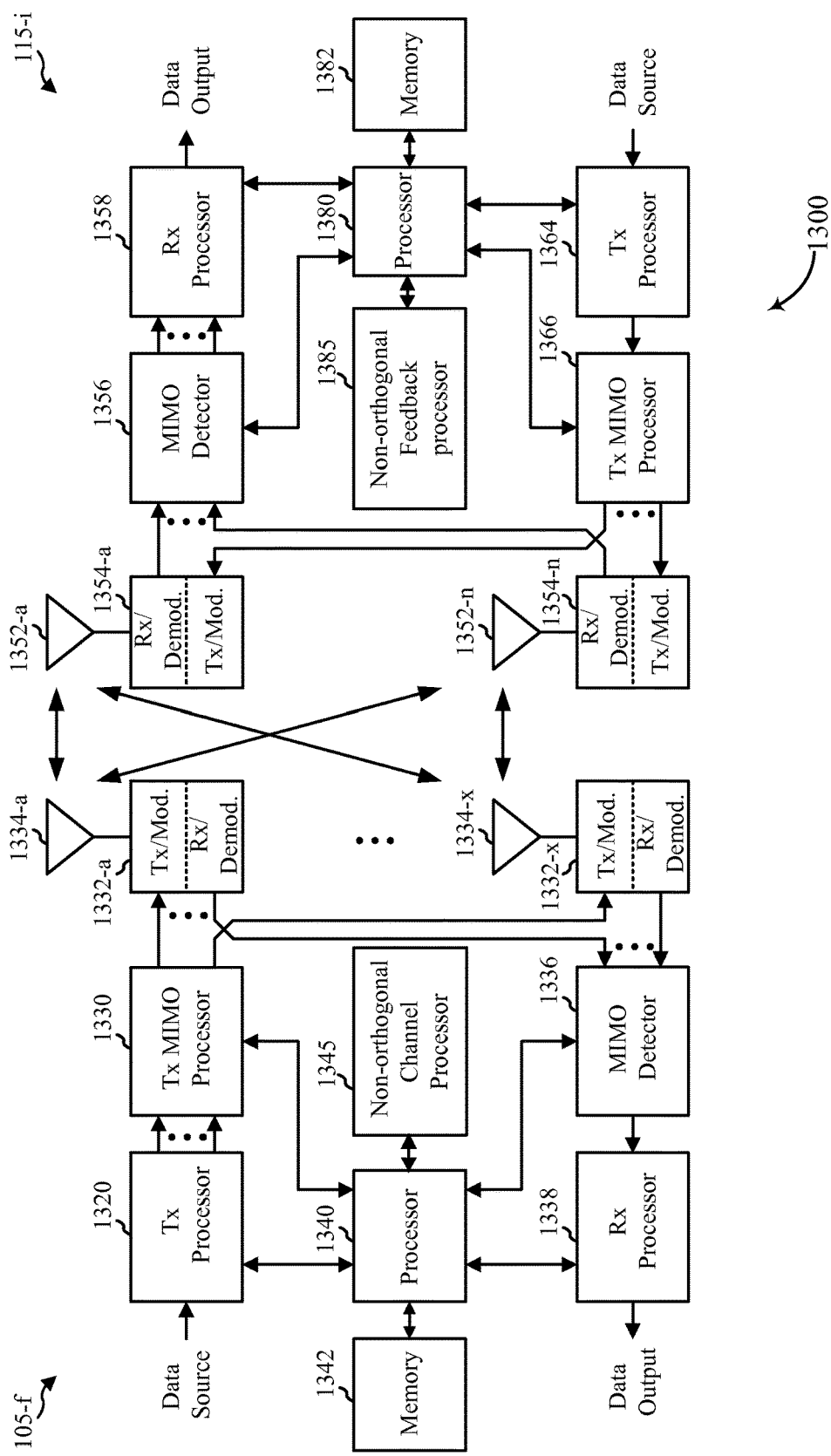
FIG. 13 shows a block diagram of a multiple-input/multiple-output communication system, in accordance with various aspects of the present disclosure.

FIG. 13 is a block diagram of a MIMO communication system 1300 including a base station 105-f and a UE 115-i. The MIMO communication system 1300 may illustrate aspects of the wireless communications systems 100 or 200 shown in FIG. 1A, 1B or 2. The base station 105-f may be equipped with antennas 1334-a through 1334-x, and the UE 115-i may be equipped with antennas 1352-a through 1352-n. In the MIMO communications system 1300, the base station 105-f may be able to send data over multiple communication links at the same time. Each communication link may be processed according to multiple-antenna techniques including SU-MIMO, MU-MIMO, and/or NOMA. For SU-MIMO, the "rank" of the communication link may indicate the number of spatial layers used for communication. For example, in a 2×2 MIMO communications system where base station 105-f transmits two spatial layers, the rank of the communication link between the base station 105-f and the UE 115-i is two.

At the base station 105-f, a transmit processor 1320 may receive data from a data source. The transmit processor 1320 may process the data. The transmit processor 1320 may also generate control symbols and/or reference symbols. A transmit (TX) MIMO processor 1330 may perform spatial processing (e.g., precoding) on data symbols, control symbols, and/or reference symbols, if applicable, and may provide output symbol streams to the transmit modulators 1332-a through 1332-x. Each modulator 1332 may process a respective output symbol stream (e.g., for OFDM, etc.) to obtain an output sample stream. Each modulator 1332 may further process (e.g., convert to analog, amplify, filter, and upconvert) the output sample stream to obtain a DL signal. In one example, DL signals from modulators 1332-a through 1332-x may be transmitted via the antennas 1334-a through 1334-x, respectively.

At the UE 115-i, the UE antennas 1352-a through 1352-n may receive the DL signals from the base station 105-d and may provide the received signals to the demodulators 1354-a through 1354-n, respectively. Each demodulator 1354 may condition (e.g., filter, amplify, downconvert, and digitize) a respective received signal to obtain input samples. Each demodulator 1354 may further process the input samples (e.g., for OFDM, etc.) to obtain received symbols. A MIMO detector 1356 may obtain received symbols from all the demodulators 1354-a through 1354-n, perform MIMO detection on the received symbols, if applicable, and provide detected symbols. A receive processor 1358 may process (e.g., demodulate, deinterleave, and decode) the detected symbols, providing decoded data for the UE 115-i to a data output, and provide decoded control information to a processor 1380, or memory 1382.

The processor 1380 may in some cases execute stored instructions to instantiate one or more of a non-orthogonal feedback processor 1385. The non-orthogonal feedback processor 1385 may perform the functions of the non-orthogonal feedback processor 930 of FIGS. 9 and 10 related to determining a measurement set of TSs, estimating channel quality for the measurement set, and reporting channel quality for a subset of the TSs of the measurement set. For example, the non-orthogonal channel feedback processor 1385 may include components or aspects of the non-orthogonal channel feedback processor 930 of FIG. 9 or 10.

On the uplink (UL), at the UE 115-i, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the demodulators 1354-a through 1354-n (e.g., for SC-FDMA, etc.), and be transmitted to the base station 105-f in accordance with the transmission parameters received from the base station 105-f. At the base station 105-f, the UL signals from the UE 115-i may be received by the antennas 1334, processed by the demodulators 1332, detected by a MIMO detector 1336 if applicable, and further processed by a receive processor 1338. The receive processor 1338 may provide decoded data to a data output and to the processor 1340 and/or memory 1342. The processor 1340 may in some cases execute stored instructions to instantiate an non-orthogonal channel scheduler 1345 which may be configured to perform the functions described above related to determining TS spaces for implicit feedback, determining TS address spaces for mixed addressing feedback, receiving CQI feedback from multiple UEs, grouping UEs in TSs for transmissions, and scheduling UEs for MIMO transmissions. The non-orthogonal channel scheduler 1345 may include the functions of the channel feedback processor 1260, the non-orthogonal channel scheduler 1265 and/or the base station transmission strategy manager 1270 described with reference to FIG. 12.

The components of the UE 115-i may, individually or collectively, be implemented with one or more ASICs adapted to perform some or all of the applicable functions in hardware. Each of the noted components may be a means for performing one or more functions related to operation of the MIMO communications system 1300. Similarly, the components of the base station 105-f may, individually or collectively, be implemented with one or more ASICs adapted to perform some or all of the applicable functions in hardware. Each of the noted components may be a means for performing one or more functions related to operation of the MIMO communications system 1300.

Figure 14:
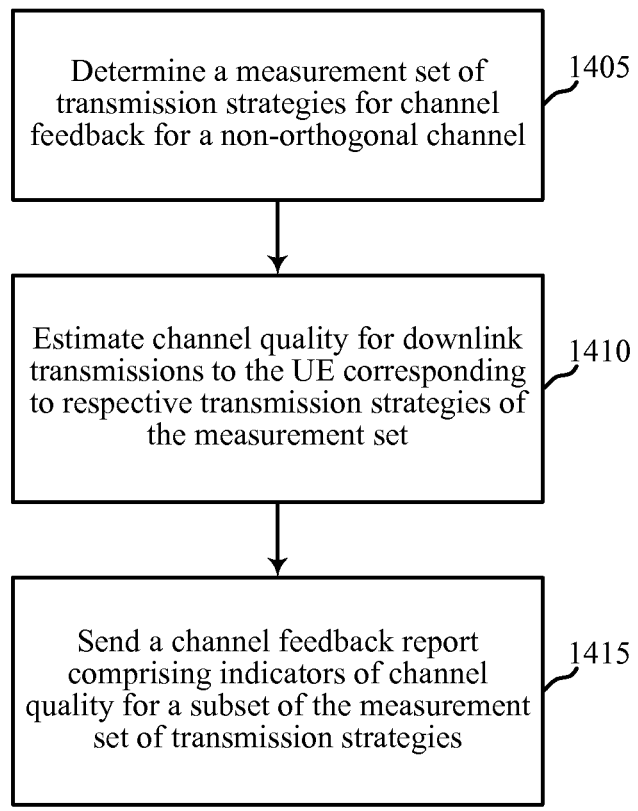
FIG. 14 is a flow chart illustrating an example of a method for wireless communication, in accordance with various aspects of the disclosure.

FIG. 14 is a flow chart illustrating an example of a method 1400 for wireless communication, in accordance with various aspects of the disclosure. For clarity, the method 1400 is described below with reference to aspects of one or more of the UEs 115 described with reference to FIGS. 1A, 1B, 2, 4, 5 and 11, and/or aspects of the device 905 or the non-orthogonal feedback processors 930 described with reference to FIGS. 9 and 10. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include determining a measurement set of TSs for channel feedback for a non-orthogonal channel. The measurement set may be determined by applying a set of TS selection criteria to an available TS space. The set of TS selection criteria may include any of power split selection criteria, spatial layer selection criteria for data streams transmitted to the UE, spatial layer selection criteria for data streams transmitted to at least one other UE, or combinations thereof. The operation(s) at block 1405 may be performed using the TS measurement set identifier 1040 described with reference to FIG. 10.

At block 1410, the method 1400 may include estimating channel quality for downlink transmissions to the UE corresponding to respective TSs of the measurement set. Each of the TSs may include any of a precoding matrix, a first set of spatial layers for data streams to the UE, a second set of spatial layers for data streams to at least one other UE, whether interference cancellation is applied to achieve a respective channel quality, a power split, or combinations thereof. The operation(s) at block 1410 may be performed using the channel quality estimator 1050 described with reference to FIG. 10.

At block 1415, the method 1400 may include sending a channel feedback report comprising indicators of channel quality for a subset of the measurement set of TSs. In some examples, the subset of the measurement set may be determined based on reporting selection criteria, which may include sequential selection criteria or random selection criteria, as described above.

The channel feedback report may include CQIs for the subset of the measurement set using explicit addressing, implicit addressing, or mixed addressing, as discussed above. For example, the channel feedback report may be formatted according to channel feedback reports 630, 730, or 830 discussed with reference to FIG. 6, 7, or 8. For implicit addressing, a predefined order for a TS space may be communicated with a base station prior to sending the channel feedback report. For mixed addressing techniques, a TS address space may be communicated with a base station prior to sending the channel feedback report. The operation(s) at block 1415 may be performed using the channel feedback reporter 1070 described with reference to FIG. 10.

Thus, the method 1400 may provide for wireless communication. It should be noted that the method 1400 is just one implementation and that the operations of the method 1100 may be rearranged or otherwise modified such that other implementations are possible.

Figure 15:
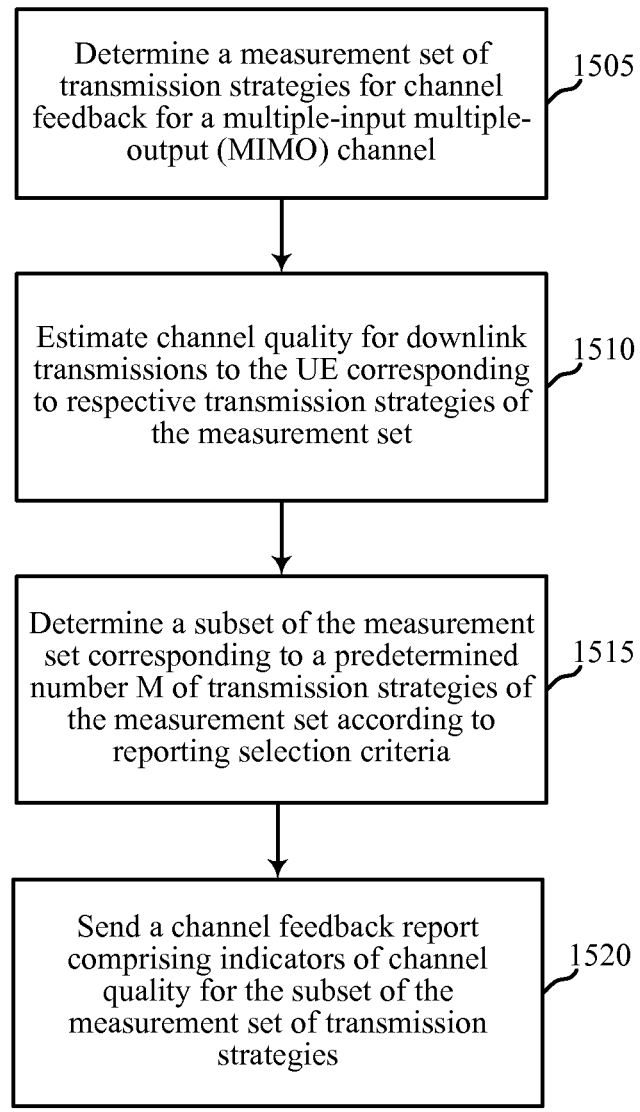
FIG. 15 is a flow chart illustrating another example of a method for wireless communication, in accordance with various aspects of the disclosure.

FIG. 15 is a flow chart illustrating an example of a method 1500 for wireless communication, in accordance with various aspects of the disclosure. For clarity, the method 1500 is described below with reference to aspects of one or more of the UEs 115 described with reference to FIGS. 1A, 1B, 2, 4, 5 and 11, and/or aspects of the device 905 or the non-orthogonal feedback processors 930 described with reference to FIGS. 9 and 10. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include determining a measurement set of TSs for channel feedback for a non-orthogonal channel. The operation(s) at block 1505 may be performed using the TS measurement set identifier 1040 described with reference to FIG. 10.

At block 1510, the method 1500 may include estimating channel quality for downlink transmissions to the UE corresponding to respective TSs of the measurement set. The operation(s) at block 1510 may be performed using the channel quality estimator 1050 described with reference to FIG. 10.

At block 1515, the method 1500 may include determine a subset of the measurement set corresponding to a predetermined number M of TSs of the measurement set according to reporting selection criteria. As described above, the reporting selection criteria may include sequential selection criteria or random selection criteria and may be determined based on a long-term SNR of the UE or a selection mode received from a base station. The operation(s) at block 1515 may be performed using the channel feedback reporter 1070 described with reference to FIG. 10.

At block 1520, the method 1500 may include sending a channel feedback report comprising indicators of channel quality for the subset of the measurement set of TSs. The operation(s) at block 1520 may be performed using the channel feedback reporter 1070 described with reference to FIG. 10.

Thus, the method 1500 may provide for wireless communication. It should be noted that the method 1500 is just one implementation and that the operations of the method 1500 may be rearranged or otherwise modified such that other implementations are possible.

In some examples, aspects of one or more of the methods 1400 or 1500 described with reference to FIG. 14 or 15 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a user equipment (UE), comprising:
   receiving, at the UE, one or more reference signals from a base station over a channel that supports multiple orthogonal or non-orthogonal transmission layers, wherein the one or more reference signals are received over a set of spatial layers;
   estimating channel quality for downlink transmissions to the UE under respective transmission strategies of a measurement set of transmission strategies based at least in part on the one or more reference signals, wherein each of the transmission strategies allocates resources of the channel for one or more data streams transmitted to one or more UEs, and wherein the measurement set of transmission strategies comprises one or more single user transmission strategies and one or more multiple user transmission strategies, and wherein the one or more multiple user transmission strategies comprise at least one multiple user transmission strategy using different spatial layers and at least one multiple user transmission strategy using non-orthogonal layers;
   selecting, at the UE, a subset of the measurement set of transmission strategies for reporting to the base station, wherein the subset of the measurement set of transmission strategies is selected based at least in part on a data rate threshold based on a proportion of a highest single user data rate for the downlink transmissions; and
   sending, to the base station, a channel feedback report comprising indicators of the channel quality for the subset of the measurement set of transmission strategies, wherein the subset of the measurement set of transmission strategies comprises at least one of the one or more single user transmission strategies and at least one of the one or more multiple user transmission strategies.

2. The method of claim 1, further comprising:
   determining the subset of the measurement set based at least in part on a predetermined number M of the transmission strategies of the measurement set and reporting selection criteria.

3. The method of claim 2, further comprising:
identifying the reporting selection criteria based at least in part on a filtered signal-to-noise ratio (SNR) of the channel or a selection mode received from the base station.

4. The method of claim 2, wherein the reporting selection criteria comprises one of a random selection criteria or a sequential selection criteria.

5. The method of claim 4, wherein the random selection criteria comprises a minimum data rate threshold and a maximum data rate threshold.

6. The method of claim 5, further comprising:
determining the highest single user data rate for the downlink transmissions;
setting the maximum data rate threshold to the highest single user data rate; and
setting the minimum data rate threshold to the proportion of the highest single user data rate.

7. The method of claim 1, wherein the channel feedback report comprises the indicators of the channel quality for respective transmission strategies of a transmission strategy space in a predefined order.

8. The method of claim 7, further comprising:
communicating, with the base station, the predefined order of the transmission strategy space prior to sending the channel feedback report.

9. The method of claim 1, wherein the channel feedback report comprises indicators of respective transmission strategies associated with each of the indicators of the channel quality for the subset of the measurement set.

10. The method of claim 9, wherein the indicators of the respective transmission strategies comprise bits of a bitmap corresponding to a transmission strategy space or indexes to the transmission strategy space.

11. The method of claim 10, further comprising:
communicating, with the base station, the transmission strategy space prior to sending the channel feedback report.

12. The method of claim 1, wherein the determining the measurement set comprises:
applying a set of transmission strategy selection criteria to an available transmission strategy space.

13. The method of claim 12, wherein the set of transmission strategy selection criteria comprises any of power split selection criteria, spatial layer selection criteria for data streams transmitted to the UE, spatial layer selection criteria for data streams transmitted to at least one other UE, or combinations thereof.

14. The method of claim 1, wherein each of the transmission strategies comprises any of a precoding matrix, a first set of spatial layers for data streams to the UE, a second set of spatial layers for data streams to at least one other UE, whether interference cancellation is applied to achieve a respective channel quality, a power split, or combinations thereof.

15. An apparatus for wireless communication by a user equipment (UE), comprising:
means for receiving, at the UE, one or more reference signals from a base station over a channel that supports multiple orthogonal or non-orthogonal transmission layers, wherein the one or more reference signals are received over a set of spatial layers;
means for estimating channel quality for downlink transmissions to the UE under respective transmission strategies of a measurement set of transmission strategies based at least in part on the one or more reference signals, wherein each of the transmission strategies allocates resources of the channel for one or more data streams transmitted to one or more UEs, and wherein the measurement set of transmission strategies comprises one or more single user transmission strategies and one or more multiple user transmission strategies, and wherein the one or more multiple user transmission strategies comprise at least one multiple user transmission strategy using different spatial layers and at least one multiple user transmission strategy using non-orthogonal layers;
means for selecting, at the UE, a subset of the measurement set of transmission strategies for reporting to the base station, wherein the subset of the measurement set of transmission strategies is selected based at least in part on a data rate threshold based on a proportion of a highest single user data rate for the downlink transmissions; and
means for sending, to the base station, a channel feedback report comprising indicators of channel quality for the subset of the measurement set of transmission strategies, wherein the subset of the measurement set of transmission strategies comprises at least one of the one or more single user transmission strategies and at least one of the one or more multiple user transmission strategies.

16. The apparatus of claim 15, further comprising:
means for determining the subset of the measurement set based at least in part on a predetermined number M of the transmission strategies of the measurement set and reporting selection criteria.

17. The apparatus of claim 16, further comprising:
means for identifying the reporting selection criteria based at least in part on a filtered signal-to-noise ratio (SNR) of the channel or a selection mode received from a base station.

18. An apparatus for wireless communication by a user equipment (UE), comprising:
a processor; and
a memory in electronic communication with the processor and instructions stored in the memory, the instructions being executable by the processor to:
receive, at the UE, one or more reference signals from a base station over a channel that supports multiple orthogonal or non-orthogonal transmission layers, wherein the one or more reference signals are received over a set of spatial layers;
estimate channel quality for downlink transmissions to the UE under respective transmission strategies of a measurement set of transmission strategies based at least in part on the one or more reference signals, wherein each of the transmission strategies allocates resources of the channel for one or more data streams transmitted to one or more UEs, and wherein the measurement set of transmission strategies comprises one or more single user transmission strategies and one or more multiple user transmission strategies, and wherein the one or more multiple user transmission strategies comprise at least one multiple user transmission strategy using different spatial layers and at least one multiple user transmission strategy using non-orthogonal layers;
select, at the UE, a subset of the measurement set of transmission strategies for reporting to the base station, wherein the subset of the measurement set of transmission strategies is selected based at least in part on a data rate threshold based on a proportion of a highest single user data rate for the downlink transmissions; and send, to the base station, a channel feedback report comprising indicators of the channel quality for the subset of the measurement set of transmission strategies, wherein the subset of the measurement set of transmission strategies comprises at least one of the one or more single user transmission strategies and at least one of the one or more multiple user transmission strategies.

19. The apparatus of claim 18, wherein the instructions are operable to cause the processor to:
determine the subset of the measurement set based at least in part on a predetermined number M of the transmission strategies of the measurement set and reporting selection criteria.

20. The apparatus of claim 19, wherein the instructions are operable to cause the processor to:
identify the reporting selection criteria based at least in part on a filtered signal-to-noise ratio (SNR) of the channel or a selection mode received from the base station.

21. The apparatus of claim 19, wherein the reporting selection criteria comprises one of a random selection criteria or a sequential selection criteria.

22. The apparatus of claim 21, wherein the random selection criteria comprises a minimum data rate threshold and a maximum data rate threshold.

23. The apparatus of claim 22, wherein the instructions are operable to cause the processor to:
determine the highest single user data rate for the downlink transmissions;
set the maximum data rate threshold to the highest single user data rate; and
set the minimum data rate threshold to the proportion of the highest single user data rate.

24. The apparatus of claim 18, wherein the channel feedback report comprises the indicators of the channel quality for respective transmission strategies of a transmission strategy space in a predefined order.

25. The apparatus of claim 24, wherein the instructions are operable to cause the processor to:
communicate, with the base station, the predefined order of the transmission strategy space prior to sending the channel feedback report.

26. The apparatus of claim 18, wherein the channel feedback report comprises indicators of respective transmission strategies associated with each of the indicators of the channel quality for the subset of the measurement set.

27. A non-transitory computer-readable medium storing code for wireless communication by a user equipment (UE), the code comprising instructions executable by a processor for:
receiving, at the UE, one or more reference signals from a base station over a channel that supports multiple orthogonal or non-orthogonal transmission layers, wherein the one or more reference signals are received over a set of spatial layers;
estimating channel quality for downlink transmissions to the UE under respective transmission strategies of a measurement set of transmission strategies based at least in part on the one or more reference signals, wherein each of the transmission strategies allocates resources of the channel for one or more data streams transmitted to one or more UEs, and wherein the measurement set of transmission strategies comprises one or more single user transmission strategies and one or more multiple user transmission strategies, and wherein the one or more multiple user transmission strategies comprise at least one multiple user transmission strategy using different spatial layers and at least one multiple user transmission strategy using non-orthogonal layers;
selecting, at the UE, a subset of the measurement set of transmission strategies for reporting to the base station, wherein the subset of the measurement set of transmission strategies is selected based at least in part on a data rate threshold based on a proportion of a highest single user data rate for the downlink transmissions; and
sending, to the base station, a channel feedback report comprising indicators of the channel quality for the subset of the measurement set of transmission strategies, wherein the subset of the measurement set of transmission strategies comprises at least one of the one or more single user transmission strategies and at least one of the one or more multiple user transmission strategies.

* * * * *